United States Patent [19]

Suzuki et al.

[11] Patent Number: 5,331,534
[45] Date of Patent: Jul. 19, 1994

[54] POWER SUPPLY APPARATUS

[75] Inventors: Shigesada Suzuki, Fuji; Masahiro Sugiyama, Gotenba; Toshiyuki Hiraoka, Numazu, all of Japan

[73] Assignee: Tokyo Electric Co., Ltd., Tokyo, Japan

[21] Appl. No.: 977,557

[22] Filed: Nov. 17, 1992

[30] Foreign Application Priority Data

| Nov. 20, 1991 | [JP] | Japan | 3-304946 |
| Dec. 6, 1991 | [JP] | Japan | 3-323255 |
| Mar. 30, 1992 | [JP] | Japan | 4-074767 |
| Jun. 3, 1992 | [JP] | Japan | 4-142876 |
| Oct. 20, 1992 | [JP] | Japan | 4-281458 |

[51] Int. Cl.$^5$ ............................................. H02M 3/335
[52] U.S. Cl. ................................. 363/20; 363/21; 363/34
[58] Field of Search ..................... 363/20, 21, 34, 131

[56] References Cited

U.S. PATENT DOCUMENTS

| 4,680,687 | 7/1987 | Stasch et al. | 363/18 |
| 4,685,041 | 8/1987 | Bowman et al. | 363/40 |

FOREIGN PATENT DOCUMENTS

| 0205287 | 12/1986 | European Pat. Off. . |
| 0371439 | 6/1990 | European Pat. Off. . |
| 0440244A2 | 8/1991 | European Pat. Off. . |
| 0488478A2 | 6/1992 | European Pat. Off. . |
| 59-78496 | 5/1984 | Japan . |
| WO 87/04891 | 8/1987 | PCT Int'l Appl. . |
| 9116802 | 10/1991 | PCT Int'l Appl. | 363/131 |
| 2056195 | 3/1981 | United Kingdom . |
| 2072968 | 10/1981 | United Kingdom . |
| 2124042 | 2/1984 | United Kingdom . |

Primary Examiner—Emanuel T. Voeltz
Assistant Examiner—Adolf Berhane
Attorney, Agent, or Firm—Frishauf, Holtz, Goodman & Woodward

[57] ABSTRACT

A power supply apparatus has a full-wave rectifier for rectifying an AC voltage from an AC power source to output a DC pulsating voltage, and a high-frequency inverter which performs an oscillating operation to generate an output voltage. A first capacitor is connected between the output terminals of the full-wave rectifier, a diode is connected to one end of the first capacitor and is forward-biased with respect to the pulsating voltage from the full-wave rectifier, a second capacitor is connected in parallel with the first capacitor through the diode, and an oscillation circuit, including a series circuit formed of an inductor and a charging capacitor is connected in parallel with the second capacitor, for storing a DC voltage lower than a peak value of the pulsating voltage from the full-wave rectifier in the charging capacitor. The high-frequency inverter receives an input current supplied from the first and second capacitors when the pulsating voltage from the full-wave rectifier is higher than the charged voltage across the charging capacitor, receives an input current supplied from the oscillation circuit when the pulsating voltage from the full-wave rectifier is lower than the charged voltage across the charging capacitor, and performs an oscillating operation in the presence of the received input current.

11 Claims, 14 Drawing Sheets

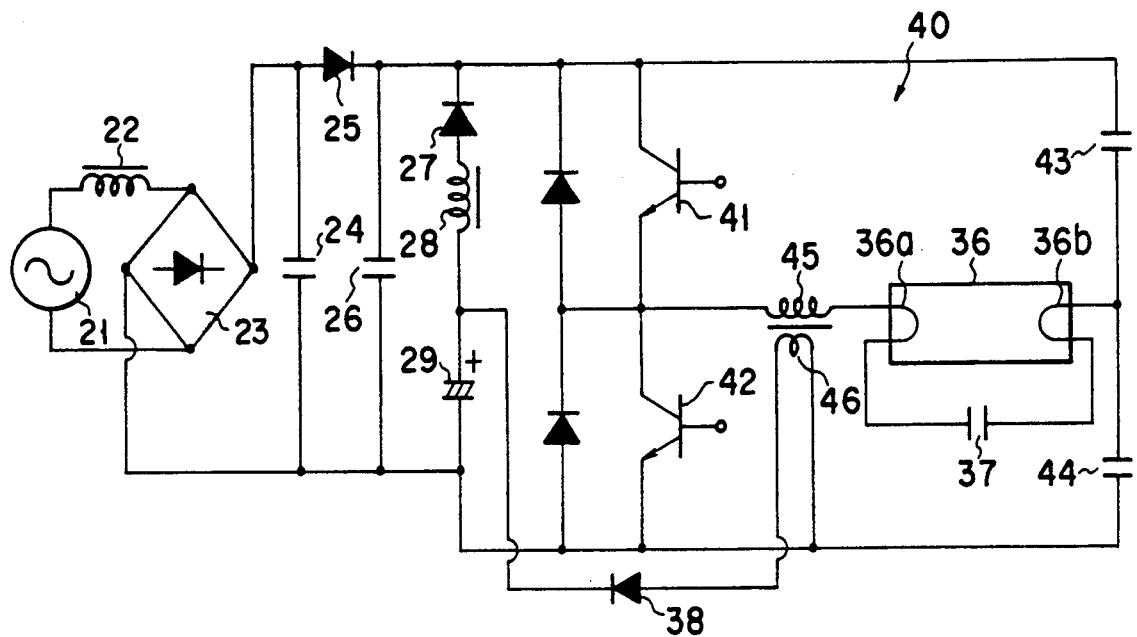
F I G. 7
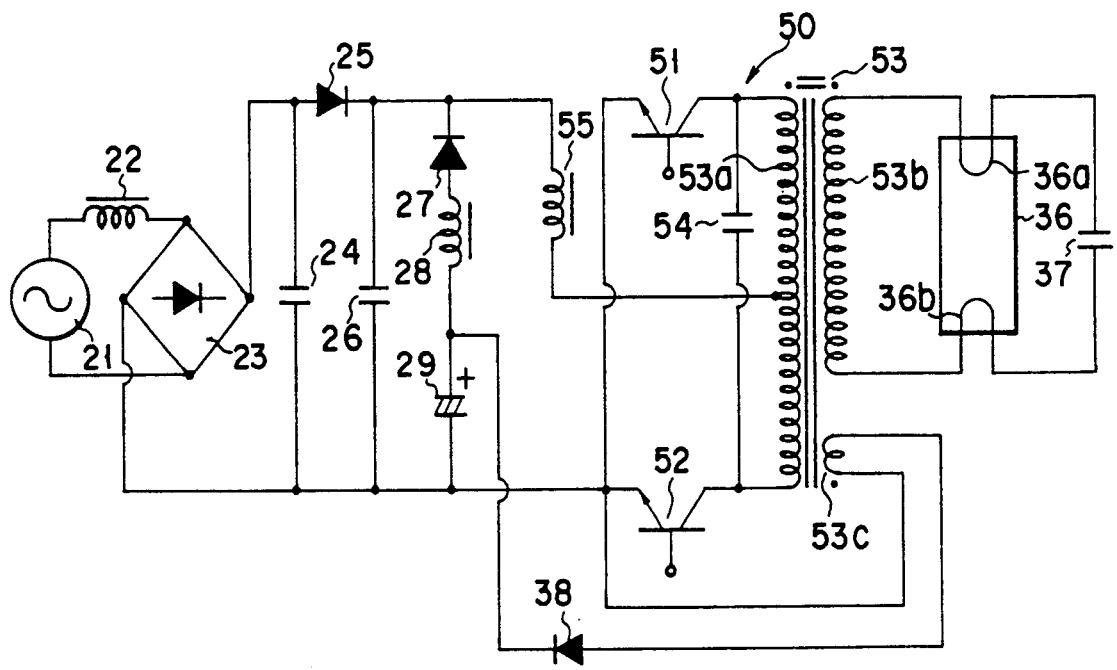
F I G. 8

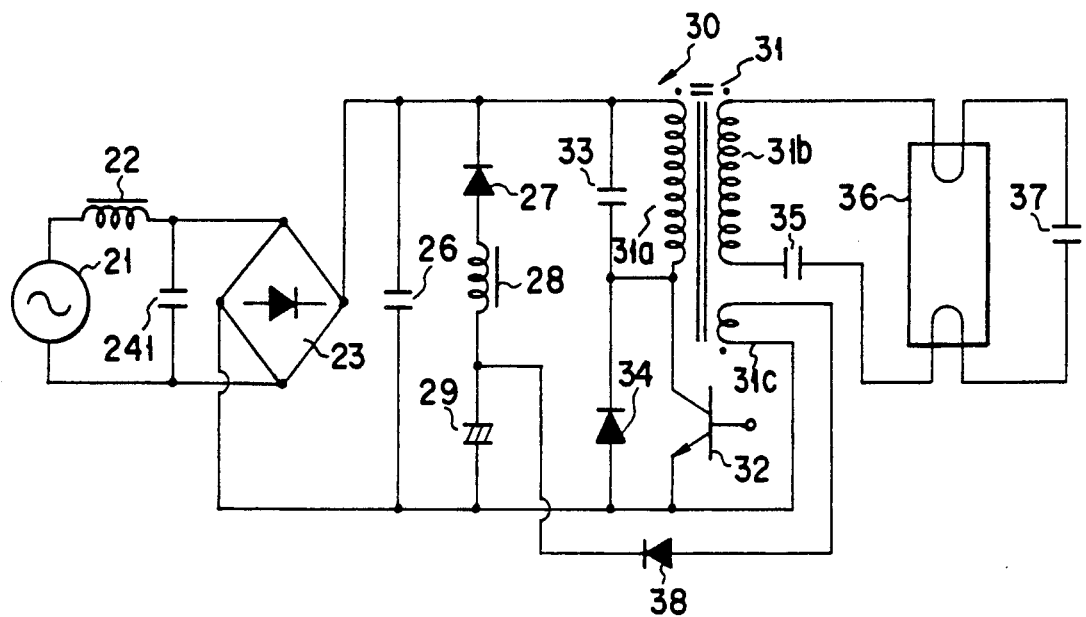
F I G. 14
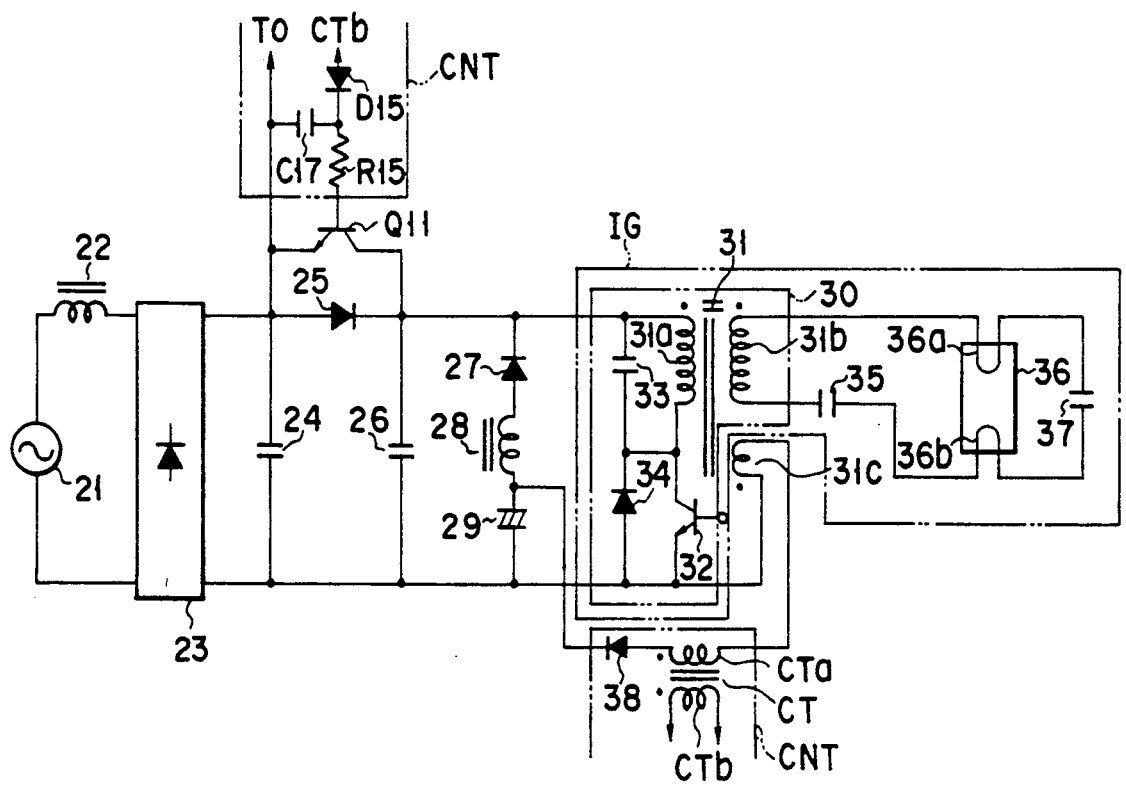
F I G. 15

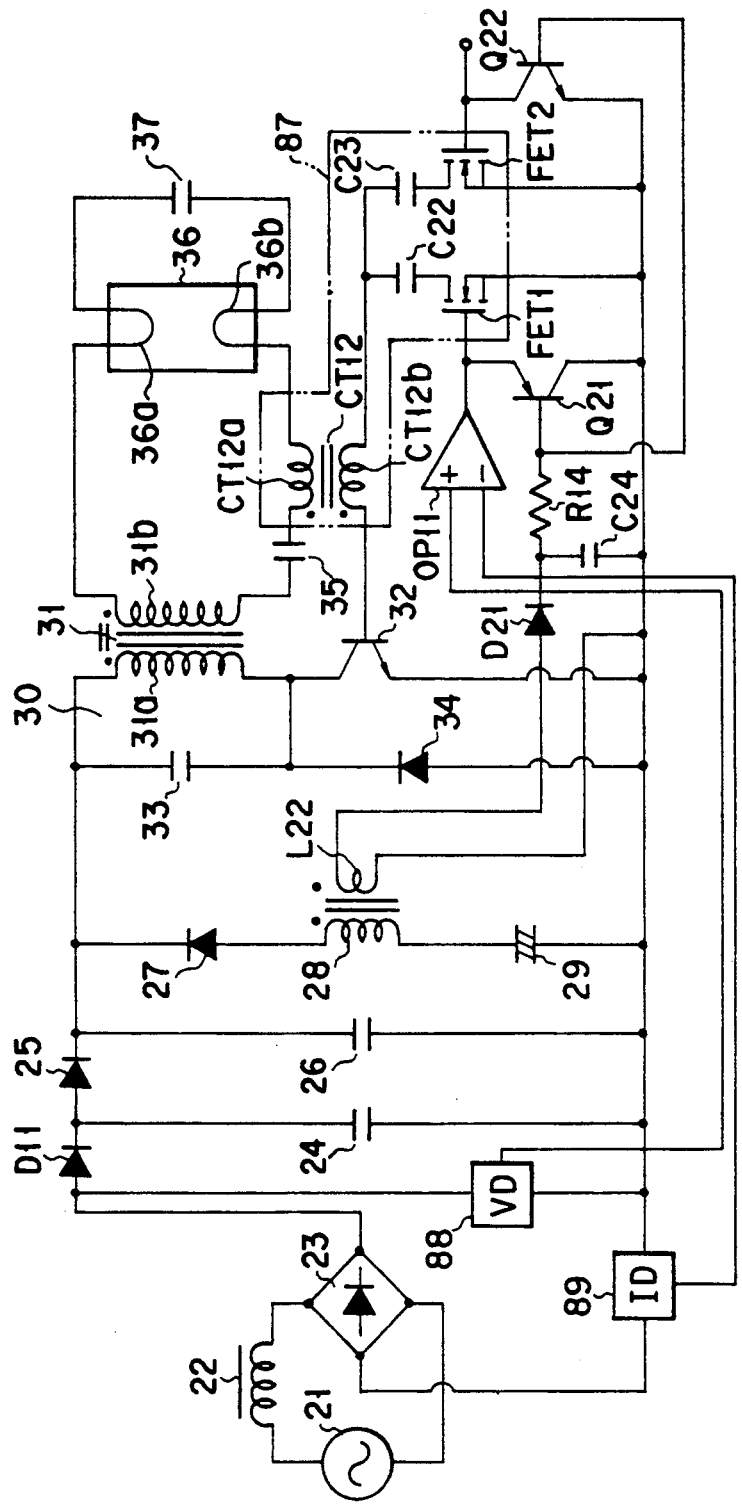
F I G. 24

POWER SUPPLY APPARATUS

BACKGROUND OF THE INVENTION

1. Field of the Invention

The present invention relates to a power supply apparatus of a high-frequency inverter type and, more particularly, to a power supply apparatus for generating a low-noise output voltage which can stably light, e.g., a discharge lamp.

2. Description of the Related Art

A power supply apparatus shown in FIG. 1 is conventionally known. In this power supply apparatus, an AC power source 1 is connected to the input portion of a full-wave rectifier 3 through a filter 2. The filter 2 is constituted by an inductor and a capacitor. The full-wave rectifier 3 is constituted by a diode bridge. The output portion of the full-wave rectifier 3 is connected to a switching transistor 5 through an inductor 4, and is further connected to a smoothing capacitor 7 through a forward-biased diode 6. The smoothing capacitor 7 is connected in parallel with a series circuit of a primary winding 12a of a transformer 12 and a switching transistor 13. A high-frequency inverter 8 includes this series circuit, a resonance capacitor 14 connected in parallel with the primary winding 12a, a diode 15 connected in parallel with the switching transistor 13, and a secondary winding 12b of the transformer 12 serving as an output portion of the inverter 8. One end of the secondary winding 12b is connected to one end of a filament 10a of a discharge lamp 10, while its the other end is connected to one end of a filament 10b of the discharge lamp 10 through a capacitor 9. A starting capacitor 11 is connected between the other ends of the filaments 10a and 10b.

In the power supply apparatus, the switching transistor 5 performs a high-frequency switching operation under the control of a control circuit 16. When the switching transistor 5 is turned on, a current flows in the inductor 4 in the presence of a pulsating voltage output from the full-wave rectifier 3. Owing to this current, energy stored in the inductor 4 is superposed on the pulsating voltage when the switching transistor 5 is turned off, thus charging the smoothing capacitor 7 through the diode 6. When such a switching operation of the switching transistor 5 is repeated, the charged voltage across the smoothing capacitor 7 is smoothed. Meanwhile, a switching current flows in the inductor 4 such that an envelope corresponding to the pulsating voltage appears as a peak. This switching current becomes a sinusoidal current in phase with the AC voltage from the AC power source 1 through the filter 2. Therefore, the input current basically contains no harmonic component, and a high power factor can be obtained.

The charged voltage across the smoothing capacitor 7 is supplied to the high-frequency inverter 8 as power source voltage, and the high-frequency switching of the switching transistor is performed in the presence of this power source voltage to operate an oscillation circuit constituted by the primary winding 12a of the transformer 12 and the resonance capacitor 14. A resonant voltage from the oscillation circuit is transmitted to the secondary winding 12b of the transformer 12. An output voltage from the secondary winding 12b is applied to the discharge lamp 10. When a current flows in a series circuit of the starting capacitor 11 and filaments 10a and 10b upon application of the output voltage, the filaments 10a and 10b are pre-heated, and at the same time the voltage across the starting capacitor 11 is increased. The discharge lamp 10 is lighted when a high voltage is generated across the starting capacitor 11 and applied to the filaments 10a and 10b.

Since the power supply apparatus is operated by means of so-called chopper control, very few harmonic components are contained in the input current to this apparatus. However, a DC current corresponding to a loss in a load circuit made up of the high frequency inverter 8 and discharge lamp 10 continuously flows from the full-wave rectifier 3 to the load circuit throughout the entire period during which the pulsating voltage is output from the full-wave rectifier 3. For this reason, each circuit component needs to have a large capacity to process a large quantity of energy. Such a circuit component is large in size and expensive. In addition, the switching transistor 5 must be periodically switched so as not to leave energy stored in the inductor 4 in the condition where the instantaneous value of the pulsating voltage is constantly changing. For such control, the control circuit 16 is inevitably complicated in structure and increased in size. With regard to energy processing by a switching operation of the switching transistor 5, since this operation is continuously performed throughout the entire period during the pulsating voltage is applied to the switching transistor 5, a large switching loss is caused. Furthermore, since a switching current has a triangular waveform, the amount of noise produced is increased. Moreover, the capacity of each circuit component connected to the power lines must be increased to cope with an excessive inrush current flowing into the smoothing capacitor 7 when the power is turned on. This also contributes to an increase in the size of the power supply apparatus.

SUMMARY OF THE INVENTION

It is an object of the present invention to provide a power supply apparatus which can reduce the amount of high-frequency noise without requiring large-size components and a complicated arrangement, and allows a reduction in size and cost.

The above object can be attained by a power supply apparatus comprising a full-wave rectifier for rectifying an AC voltage from an AC power source to output a DC pulsating voltage, a first capacitor connected between output terminals of the full-wave rectifier, a diode connected to one end of the first capacitor and forward-biased with respect to the pulsating voltage from the full-wave rectifier, a second capacitor connected to receive the pulsating voltage from the full-wave rectifier through the diode, an oscillation circuit, including a series circuit of an inductor and a charging capacitor which circuit is connected in parallel with the second capacitor, for storing a DC voltage lower than a peak value of the pulsating voltage from the full-wave rectifier in the charging capacitor, and a high-frequency inverter, connected to receive an input current supplied from the first and second capacitors when the voltage from the full-wave rectifier is higher than the charged voltage across the charging capacitor, and receive an input current supplied from the second capacitor when the pulsating voltage from the full-wave rectifier is lower than the charged voltage across the charging capacitor, for performing an oscillating operation in the presence of the received current to generate an output voltage.

According to this power supply apparatus, energy supply to the high-frequency inverter is controlled in accordance with the difference between the charged voltage across the charging capacitor and the pulsating voltage from the rectifier.

In a state wherein the charged voltage across the charging capacitor is lower than the pulsating voltage from the rectifier, the first and second capacitors supply a current to the high-frequency inverter when the inverter is ON. That is, the high-frequency inverter receives a required amount of energy from the first and second capacitors. An input current is supplied from the AC power source so as to supplement the energy supplied from the first and second capacitors and consumed by the high-frequency inverter. In addition, the charging capacitor is charged by the oscillation circuit when the high-frequency inverter is OFF.

In a state wherein the pulsating voltage from the rectifier is lower than the charged voltage across the charging capacitor, only the second capacitor supplies a current to the high-frequency inverter when the high-frequency inverter is ON. The voltage across the second capacitor is decreased if the second capacitor does not have a capacitance large enough to supply a required amount of energy to the high-frequency inverter. When the voltage across the second capacitor is decreased below that across the first capacitor, the first capacitor starts energy supply. Discharging from the charging capacitor to the high-frequency inverter is delayed because of the presence of the inductor. This discharging operation is performed immediately before the high-frequency inverter is turned off. When the high-frequency inverter is turned off, the charging capacitor serves as a voltage source for causing the inductor and the second capacitor to oscillatory resonate. The second capacitor is charged as a result of this oscillatory resonance. In this charging operation, the amplitude of oscillatory resonance is increased with a decrease in the pulsating voltage from the rectifier. Accordingly, supply of the input current from the AC power source is continued.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 7 to 14 are views respectively showing first to eighth modifications of the power supply apparatus shown in FIG. 2;

FIG. 15 is a circuit diagram showing the arrangement of a power supply apparatus according to a second embodiment of the present invention;

FIG. 24 is a circuit diagram showing a modification of the fourth embodiment of the present invention.

DETAILED DESCRIPTION OF THE PREFERRED EMBODIMENTS

A power supply apparatus according to a first embodiment of the present invention will be described below with reference to FIGS. 2 to 6.

Figure 1:
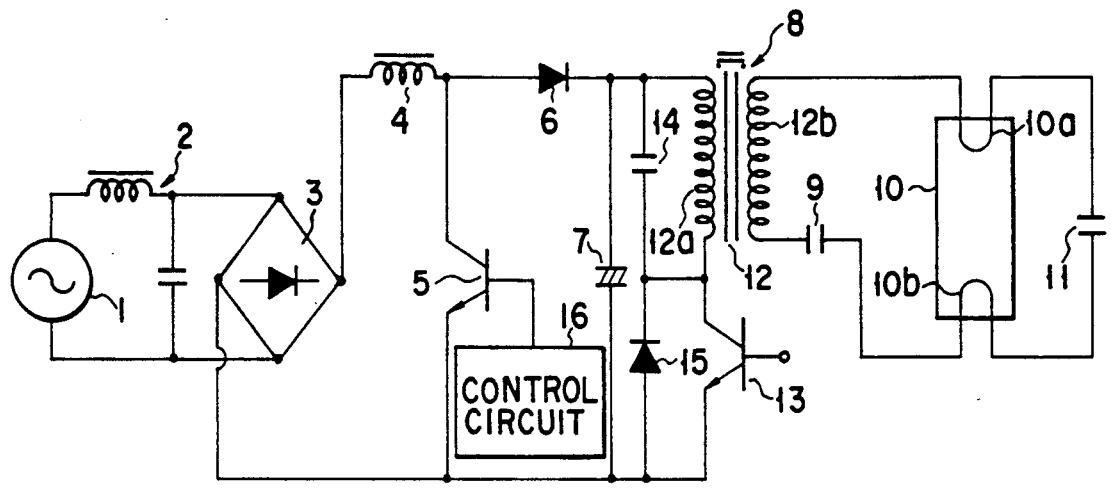
FIG. 1 is a circuit diagram showing the arrangement of a conventional power supply apparatus.
Figure 2:
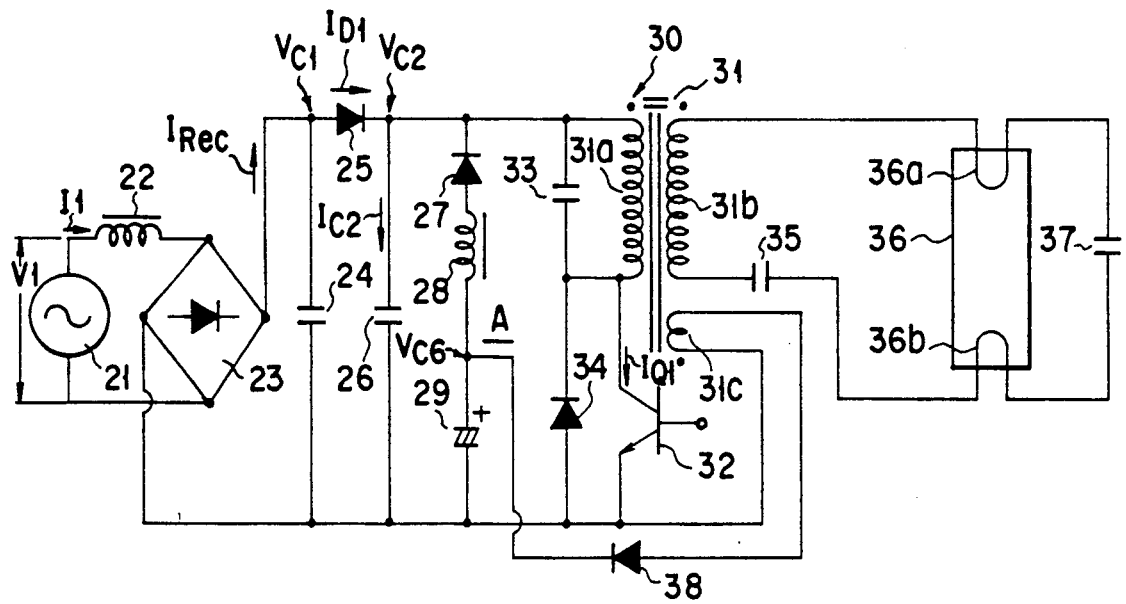
FIG. 2 is a circuit diagram showing the arrangement of a power supply apparatus according to a first embodiment of the present invention.
Figure 3:
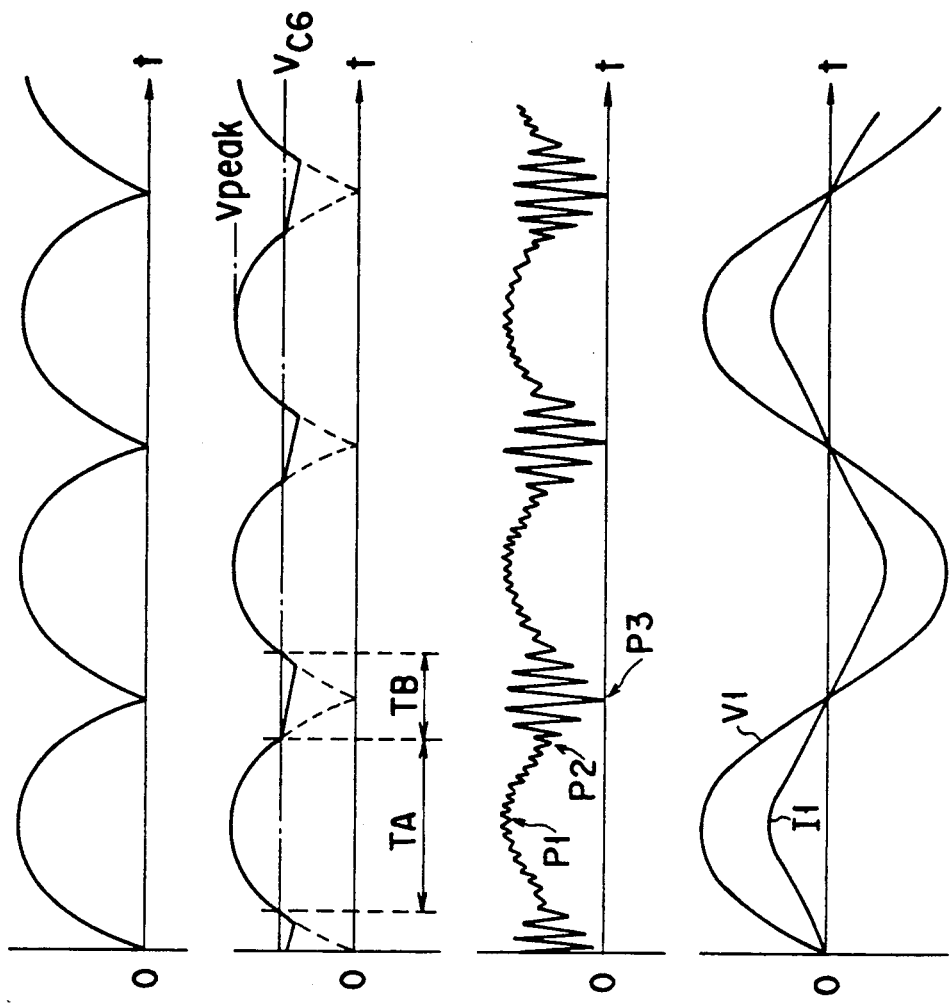
FIGS. 3(a) to 3(d) are charts showing the waveforms of voltages Vc1, Vc2′, Vc2, and V1 and a current I1 obtained in the power supply apparatus shown in FIG. 2.
Figure 4:
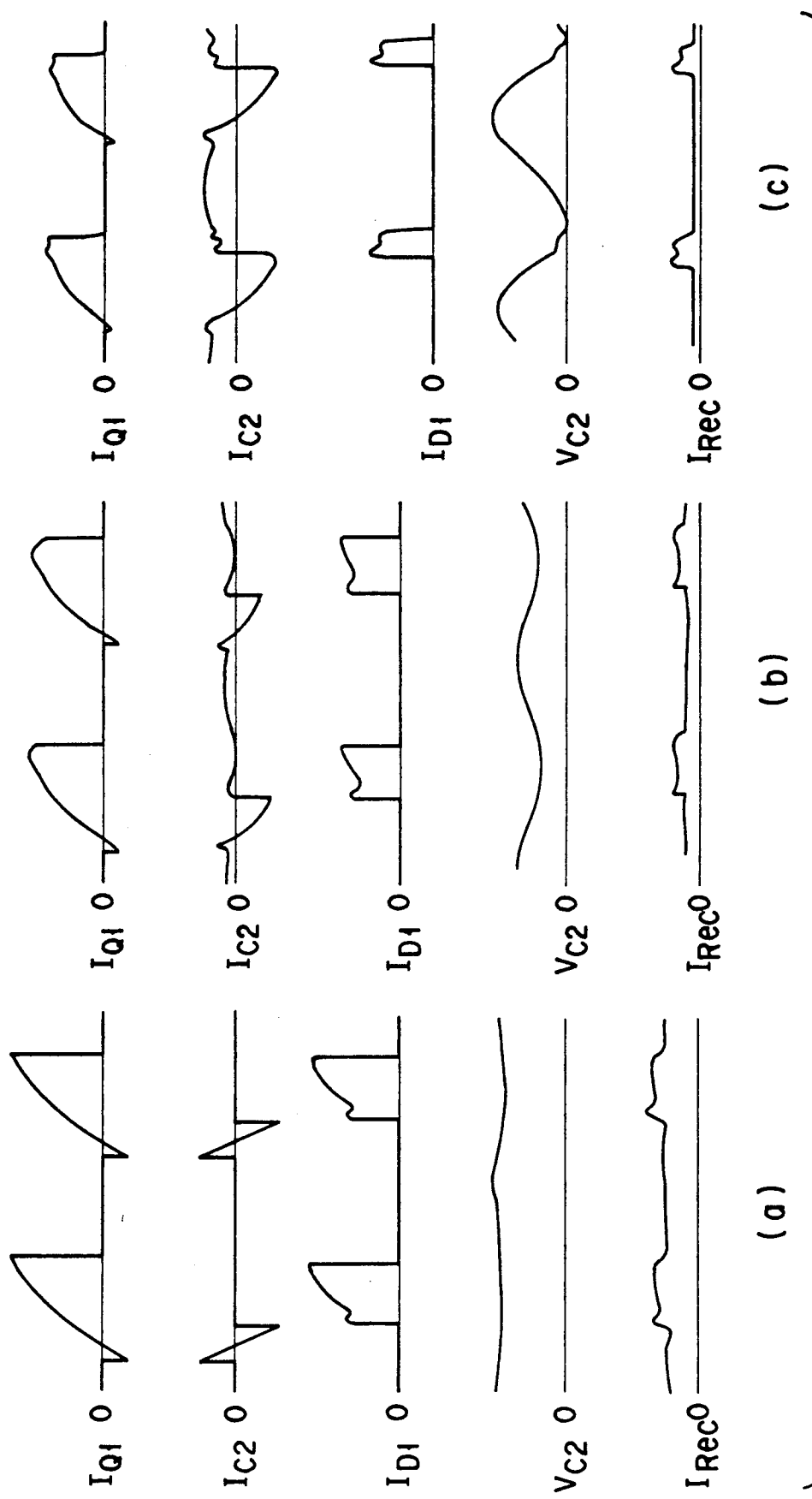
FIGS. 4(a) to 4(c) are charts each showing the waveforms of a voltage Vc1 and currents IQ1, Ic2, ID1, and IRec obtained nearly at points P1, P2, and P3 shown in FIG. 3(c), respectively.
Figure 5:
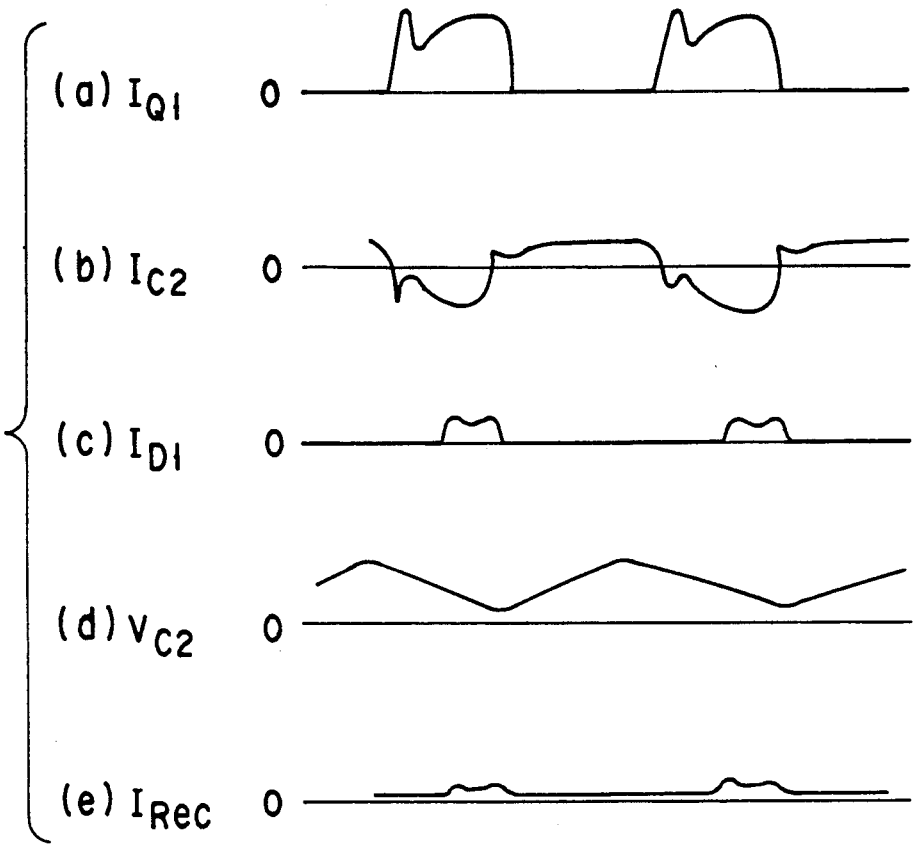
FIGS. 5(a) to 5(e) are the waveforms of a voltage Vc1 and currents IQ1, Ic2, ID1, and IRec obtained when inappropriate resonance conditions are set.

FIG. 2 shows the circuit arrangement of this power supply apparatus. For example, the power supply apparatus is used to stably light a discharge lamp. An AC power source 21 is connected to the input portion of a full-wave rectifier 23 constituted by a diode bridge through an inductor 22. The output portion of the full-wave rectifier 23 is connected to a first capacitor 24 to apply a pulsating voltage. The first capacitor 24 is connected in parallel with a second capacitor 26 through a diode 25 which is forward-biased on the positive pole side of the full-wave rectifier 23. The second capacitor 26 is connected in parallel with a charging capacitor 29 through a reverse-biased diode 27 and an inductor 28. The second capacitor 26 is connected to a high-frequency inverter 30 of a single transistor type. The high-frequency inverter 30 includes a series circuit of a primary winding 31a of a transformer 31 and a switching transistor 32, a resonant capacitor 33 connected in parallel with the primary winding 31a of the transformer 31, and a diode 34 connected in parallel with the switching transistor 32. The series circuit of the primary winding 31a and the switching transistor 32 is connected in parallel with the second capacitor 26. The switching transistor 32 is driven by a drive circuit (not shown) to perform a high-frequency switching operation. One end of a secondary winding 31b of the transformer 31 is connected to one end of a filament 36a of a discharge lamp 36, while its the other end is connected to one end of a filament 36b of the discharge lamp 36 through a capacitor 35. A starting capacitor 37 is connected between the other ends of the filaments 36a and 36b. The transformer 31 has a tertiary winding 31c connected in parallel with the charging capacitor 29 through a diode 38. An oscillation circuit A is constituted by the second capacitor 26, the diode 27, the inductor 28, the charging capacitor 29, the tertiary winding 31c, and the diode 38.

In the power supply apparatus having the above-described arrangement, voltages Vc1 and Vc2 shown in FIGS. 3(a) and 3(c) are obtained across the first and second capacitors 24 and 26 when the apparatus is operated. For the sake of easy understanding of the embodiment, FIG. 3(b) shows a voltage across the second capacitor 26 obtained in a case where the inductor 28 does not exist, and the second capacitor 26 has a capacitance large enough to pose no hindrance to an operation of the high-frequency inverter 30.

An oscillating operation of the high-frequency inverter 30 is performed upon switching of the switching transistor 32. Meanwhile, the primary winding 31a is resonated with the resonant capacitor 33 and generates a high-frequency voltage as a result of the resonation. The tertiary winding 31c generates a high-frequency voltage induced on the basis of the ratio of the number of turns of the tertiary winding 31c to that of the primary winding 31a. This voltage is used to charge the charging capacitor 29 through the diode 38. The charging capacitor 29 stores a voltage Vc6 corresponding to the high-frequency voltage from the tertiary winding 31c. As shown in FIG. 3(b), this voltage Vc6 is set lower than a peak value Vpeak of the pulsating voltage Vc1 applied from the capacitor 24 to the capacitor 26 through the diode 25.

An operation of the power supply apparatus will be described below, provided that a period in which the pulsating voltage Vc1 is higher than the charged voltage Vc6 across the charging capacitor 29 is represented by TA; and a period in which the pulsating voltage Vc1 is lower than the charged voltage Vc6, TB.

(A) Period TA

When the transistor 32 of the high-frequency inverter 30 is turned on in the period TA, the first and second capacitors 24 and 26 are simultaneously discharged to supply a current to the primary winding 31a of the transformer 31. (The first and second capacitors 24 and 26 have a composite capacitance capable of supplying energy required by the high-frequency inverter 30.) On the AC power source side, an input current I1 is supplied so as to supplement energy corresponding to the current supply from the first and second capacitors 24 and 26 to the primary winding 31a. This operation is effected in accordance with the pulsating voltage Vc1 each time the transistor 32 is turned on. In the period of TA, a high-frequency voltage having a small and uniform amplitude is generated by the switching of the transistor 32. As shown in FIG. 3(c), this high-frequency voltage is, throughout the period TA, superposed on the voltage Vc2, which changes in the form of a sine wave due to application of the pulsating voltage Vc1. Since the composite capacitance of the first and second capacitors 24 and 26 is selected to satisfy the requirement of the high-frequency inverter 30, heat generation and ripple in their output voltages are suppressed. Therefore, the power supply apparatus can acquire high operation reliability. In the period TA, the charging capacitor 29 discharges no current to the inverter side and is charged by a current supplied from the tertiary winding 31c when the transistor 32 is OFF.

(B) Period TB

When the transistor 32 is turned off in a state wherein the pulsating voltage V1 is slightly lower than the charged voltage Vc6 across the charging capacitor 29, the second capacitor 26 is discharged to supply a current to the primary winding 31a of the transformer 31. This second capacitor 26 does not have a capacitance large enough to supply the amount of energy required by the high-frequency inverter 30 by itself. For this reason, the voltage Vc2 across the second capacitor 26 is decreased with an increase in current flowing in the primary winding 31a after the transistor 32 is turned on. When the voltage Vc2 is decreased below the voltage Vc1 across the first capacitor 24, the first capacitor 24 supplies energy to the high-frequency inverter 30 to compensate for a shortage of energy supplied from the second capacitor 26. This operation is continued until the transistor 32 is turned off. The decrease in the voltage Vc2 is restricted after the first capacitor 24 begins to supply energy. When energy is supplied from the first capacitor 24 to the inverter 30, a corresponding quantity of energy is supplied from the AC power source 21 side, as the input current I1.

Meanwhile, discharge of energy from the charging capacitor 29 is delayed because of the transient impedance of the inductor 28 and is started immediately before the transistor 32 is turned off. After the transistor 32 is turned off, the charged voltage Vc6 of the charging capacitor 29 serves as a voltage source to a series circuit of the inductor 28, the diode 27, and the second capacitor 26. Since the second capacitor 26 and the inductor 28 are designed to obtain oscillatory resonance, the voltage Vc2 across the second capacitor 26 changes in the form of a sine wave while the second capacitor 26 is charged. This voltage Vc2 is raised to a level at which no energy shortage occurs when the transistor 32 is turned on again in the inverter 30.

The voltage Vc2 across the second capacitor 26 is decreased as the voltage Vc1 across the first capacitor 24 becomes lower than the voltage Vc6 across the charging capacitor 29. The amplitude of the resonant voltage generated by the inductor 28 and the second capacitor 26 is increased with a decrease in the voltage Vc2. At this time, although the input current I1 is decreased, the current supply is continued. As a result, the voltage Vc2 across the second capacitor 26 actually has a waveform as shown in FIG. 3(c). In FIG. 3(c), reference symbol P1 denotes a point at which the voltage Vc2 reaches its peak value; P2, a point at which the voltage Vc2 becomes slightly lower than the voltage Vc6, and a resonating operation of the inductor 28 and the second capacitor 26 is started; and P3, a point at which the voltage Vc2 becomes almost zero. In addition, the input current I1 and the input voltage V1 of this apparatus actually have waveforms shown in FIG. 3(d). Since the input current I1 continuously flows from the AC power source 21, harmonic components are prevented from being contained in the input current I1.

FIGS. 4(a), 4(b), and 4(c) each show a collector current IQ1 flowing in the transistor 32, a current IC2 flowing from the second capacitor 26, a current ID1 flowing through the diode 25, a voltage Vc2 developed across the second capacitor 26, and a current IRec flowing the full-wave rectifier 23, which are obtained nearly at the points P1, P2, and P3, respectively. The current IRec is almost equal to the input current I1.

The collector current IQ1 flows when the transistor 32 is turned on. The amount of the collector current is determined according to the voltage Vc2 from the capacitor 26. Since the voltage Vc2 has its peak value at the point P1, the amount of collector current IQ1 is maximum. (The amount of the collector current IQ1 is reduced in a period between the points P1 and P2, and further reduced in a period between the points P2 and P3.) Further, a sufficient amount of current ID1 is supplied from the first capacitor 24 to the inverter 30 through the diode 25 when the transistor 32 is turned on. Since the amount of current IC2 supplied from the capacitor 26 is relatively small at this time, the voltage Vc2 scarcely varies. The current IRec flows from the full-wave rectifier 23 so as to supplement the energy supplied from the first capacitor 24 to the second capacitor 26 through the diode 25. The input current I1 flows from the AC power source 21 to the rectifier 23 in accordance with the current IRec.

In the period between the points P2 and P3, the amplitude of the resonant voltage generated by the inductor 28 and the second capacitor 26 is increased as the voltage Vc1 becomes lower than the charged voltage Vc6. That is, the voltage Vc2 across the second capacitor 26 is increased before the transistor 32 is turned on, as shown in FIG. 4(c), so that the capacitor 26 can supply sufficient energy when the transistor 32 is turned on. Therefore, the inverter 30 can perform a stable oscillating operation throughout the entire period during which the transistor 32 is ON. The current IRec flows in accordance with a decrease in the voltage Vc1, and an input current I1 equivalent to the current IRec is continuously supplied from the AC power source 21. As a result, an input current I1 having very few harmonic components is obtained, as shown in FIG. 3(d). In this case, it is important that resonance conditions of the inductor 28 and the second capacitor 26 are adjusted to generate a resonant voltage synchronous to the ON-/OFF timing of the transistor 32, to thereby render the oscillating operation of the inverter 30 stable at the point P3, at which the voltage Vc2 becomes almost 0.

Figure 6:
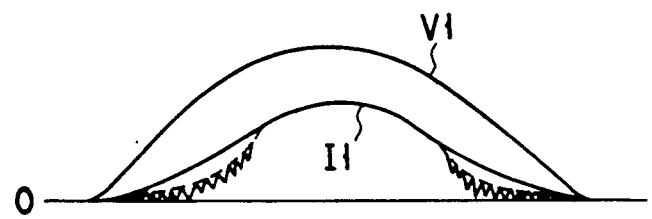
FIG. 6 is a chart showing the waveforms of a voltage V1 and a current I1 input to the power supply apparatus shown in FIG. 2, along with harmonic components contained in the input current.

If a resonance voltage not synchronous to the ON-/OFF timing of the transistor 32 is generated because of inappropriate resonance conditions of the inductor 28 and the second capacitor 26, the currents IQ1, IC2, ID1, and IRec and the voltage Vc2 respectively have waveforms like those shown in FIGS. 5(a) to 5(e). That is, the voltage Vc2 across the second capacitor 26 cannot be raised to a sufficiently high level, and hence a shortage of energy supplied to the inverter 30 occurs. In this case, the current IQ1 quickly rises in the form of a spike, since the currents ID1 and IRec flow in small amounts. As a result, the input current I1 has a waveform in a half-cycle period of the AC voltage V1 as shown in FIG. 6. In FIG. 6, a large amount of harmonic components is contained in recess portions X indicated by the broken lines. (The input current I1 obtained in the embodiment is indicated by the solid line in FIG. 6.) The amount of noise and the switching loss caused in the transistor are increased when the input current I1 fluctuates in the form of a spike at the recess portions X.

If the frequency of the resonance circuit constituted by the inductor 28 and the second capacitor 26 is too high with respect to oscillation caused by the inverter 30, the current IQ1 flowing in the transistor 32 becomes unstable. This interferes with a stable oscillating operation of the inverter 30 and a reduction in harmonic component in the input current I1.

The operation of the resonance circuit constituted by the inductor 28 and the second capacitor 26 is greatly dependent on the internal impedance and capacitance of the charging capacitor 29. More specifically, the internal impedance regulates the amplitude of a resonant voltage in the entire half-cycle period of the AC voltage V1, whereas the capacitance regulates the amplitude of the resonant voltage in part of the half-cycle period of the AC voltage V1. If the capacitance of the charging capacitor 29 is too small, the amplitude of the resonant voltage obtained by the resonance circuit is decreased in a period during which the voltage Vc2 is close to the zero level corresponding to the point P3 shown in FIG. 3(c), or in a period during which the voltage Vc2 rises from the zero level to the maximum level corresponding to the point P1. This prolongs the period during which the quickly raised current IQ1 continuously flows in the transistor 32, thus posing problems similar to those described above. Therefore, the internal impedance and capacitance of the charging capacitor 29 are properly set to prevent such a problem.

Assume that the capacitance of the first capacitor 24 is too small. In this case, even if a large amplitude of the resonant voltage is obtained by the resonance between the inductor 28 and the second capacitor 26, a shortage of energy supplied from the AC power source 21 side occurs, and the input current I1 is greatly decreased in the period TB shown in FIG. 3(b). As a result, the input current I1 becomes a spike current containing a large amount of harmonic components, posing problems similar to those described above. In contrast to this, if the capacitance of the first capacitor 24 is too large, the waveform of the voltage Vc1 shown in FIG. 3(a) is distorted to have low-level portions shifted to the high-level side. This allows the input current I1 not to flow temporarily in the period TB, thus increasing the amount of harmonic components in the input current I1. Therefore, the capacitance of the first capacitor 24 is properly set to prevent such a problem.

In the above-described power supply apparatus, the first capacitor 24 can remove ripple superposed on the input current I1 upon switching of the transistor 32. When the power is turned on, a spike inrush current rushes in the first and second capacitors 24 and 26. However, this inrush current is negligibly small as compared with that in the conventional power supply apparatus. For this reason, even if circuit components connected to the power supply line are small-size components having low breakdown voltages, there is hardly any chance that these components are damaged by the inrush current. In addition, a main part of the power supply apparatus can be easily constituted by the capacitors 24 and 26, the inductor 28, the diodes 25, 27, and 38, and the tertiary winding 31c. That is, the first embodiment requires no large-size components and complicated arrangement to reduce the amount of high-frequency noise and allows a reduction in the size and cost of the power supply apparatus.

Various modifications and changes of the first embodiment can be made without departing from the spirit and scope of the invention. For example, FIGS. 7 to 13 respectively show the circuit arrangements of first to eighth modifications, in each of which the same effects as those of the first embodiment can be obtained. The same reference numerals in FIGS. 7 to 14 denote the same parts as in the first embodiment, and a description thereof will be omitted.

In the first modification shown in FIG. 7, the high-frequency inverter 30 shown in FIG. 2 is replaced by a high-frequency inverter 40 of a half-bridge type. This inverter 40 includes a series circuit of switching transistors 41 and 42 and a series circuit of capacitors 43 and 44. The discharge lamp 36 is connected in series with an inductor 45 between the node of the switching transistors 41 and 42 and the node of the capacitors 43 and 44. The inductor 45 is magnetically coupled to a coil 46. The coil 46 is connected in parallel with the charging capacitor 29 through the diode 38. The same effects as those in the first embodiment can be obtained in this modification, since a DC voltage lower than the peak value of the pulsating voltage Vc1 is stored in the charging capacitor 29 by means of the coil 46. Note that one of the capacitors 43 and 44 may be omitted from the inverter 40.

In the second modification shown in FIG. 8, the high-frequency inverter 30 shown in FIG. 2 is replaced by a high-frequency inverter 50 of a push-pull type. This inverter 50 includes switching transistors 51 and 52, a transformer 53, and a capacitor 54. The collector of the switching transistor 51 is connected to one end of a primary winding 53a of the transformer 53. The collector of the switching transistor 52 is connected to the other end of the primary winding 53a of the transformer 53. The capacitor 54 is connected in parallel with the primary winding 53a of the transformer 53. The emitters of the transistors 51 and 52 are both connected to the negative terminal of the charging capacitor 29. The positive terminal of the charging capacitor 29 is connected to the intermediate tap of the primary winding 53a of the transformer 53 through an inductor 55. The discharge lamp 36 is connected in parallel with a secondary winding 53b of the transformer 53. A tertiary winding 53c of the transformer 53 is connected in parallel with the charging capacitor 29 through the diode 38. The same effects as those in the first embodiment can be obtained in this modification, since a DC Voltage lower than the peak value of the pulsating voltage Vc1 is stored in the charging capacitor 29 by means of the tertiary winding 53c.

Figure 9:
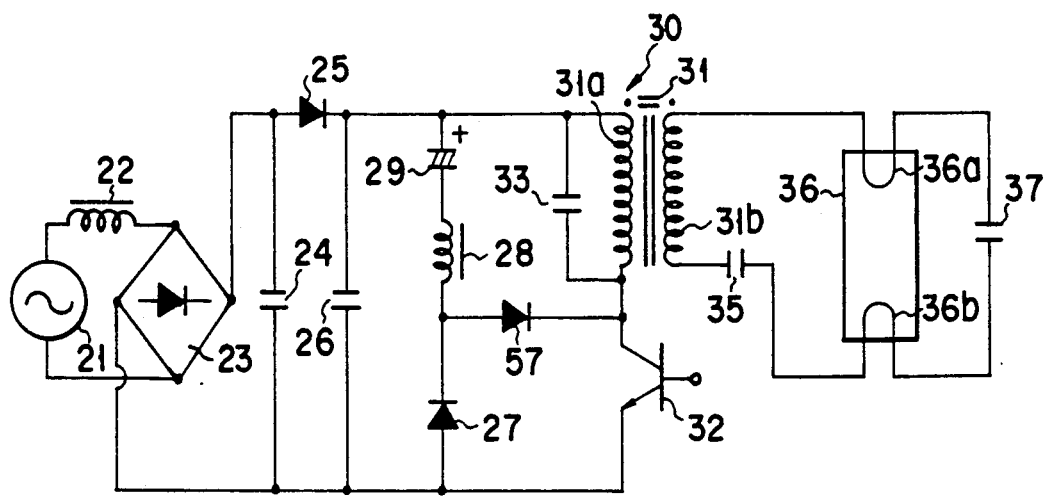

In the third modification shown in FIG. 9, the positions of the charging capacitor 29 and the diode 27 shown in FIG. 2 are exchanged with each other, and the node of the inductor 28 and the cathode of the diode 27 is connected to the collector of the transistor 32 through a diode 57. When the transistor 32 is turned on, a current flows from the power source side to the primary winding 31a of the transformer 31 to charge the charging capacitor 29. At this time, the charged voltage Vc6 of the charging capacitor 29 is determined by the impedance ratio. Since a DC voltage lower than the peak value of the pulsating voltage Vc1 can be stored in the charging capacitor 29, the same effects as those in the first embodiment can be obtained in this modification.

Figure 10:
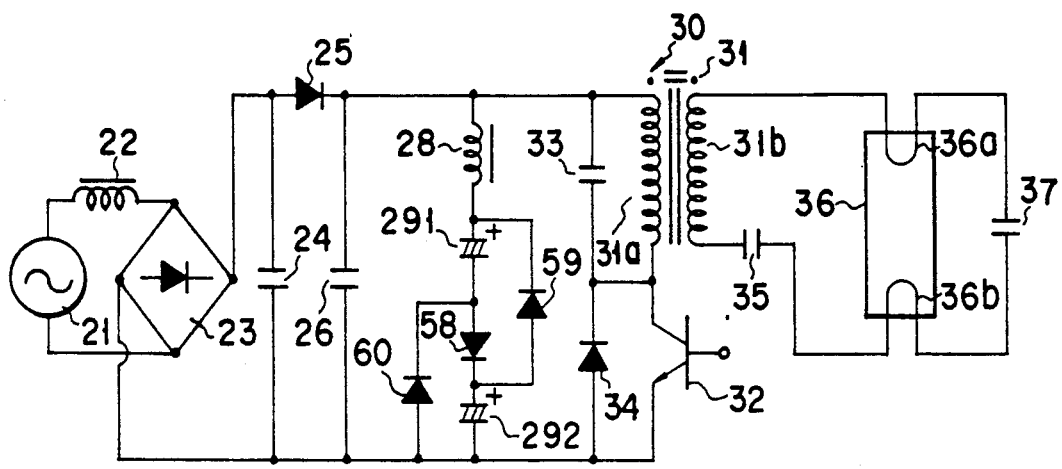

In the fourth modification shown in FIG. 10, the charging capacitor 29 shown in FIG. 2 is replaced by charging capacitors 291 and 292. The positive terminal of the charging capacitor 291 is connected to one end of the second capacitor 26 through an inductor 28, while the negative terminal thereof is connected to the anode of a diode 58. The positive terminal of the charging capacitor 292 is connected to the cathode of the diode 58, while the negative terminal thereof is connected to the other end of the second capacitor 26. A diode 59 is connected in parallel with a series circuit of the charging capacitor 291 and the diode 58 while the anode of the diode 59 is connected to the cathode of the diode 58. A diode 60 is connected in parallel with a series circuit of the charging capacitor 292 and the diode 58 while the cathode of the diode 60 is connected to the anode of the diode 58.

In this arrangement, a pair of the charging capacitors 291 and 292 stores the peak value of the pulsating voltage Vc1. Each of the charging capacitor 291 and 292 is discharged to supply energy to the resonance circuit constituted by the second capacitor 26 and the inductor 28 when the pulsating voltage Vc1 becomes lower than the its charged voltage. Therefore, the same effects as those in the first embodiment can be obtained.

Figure 11:
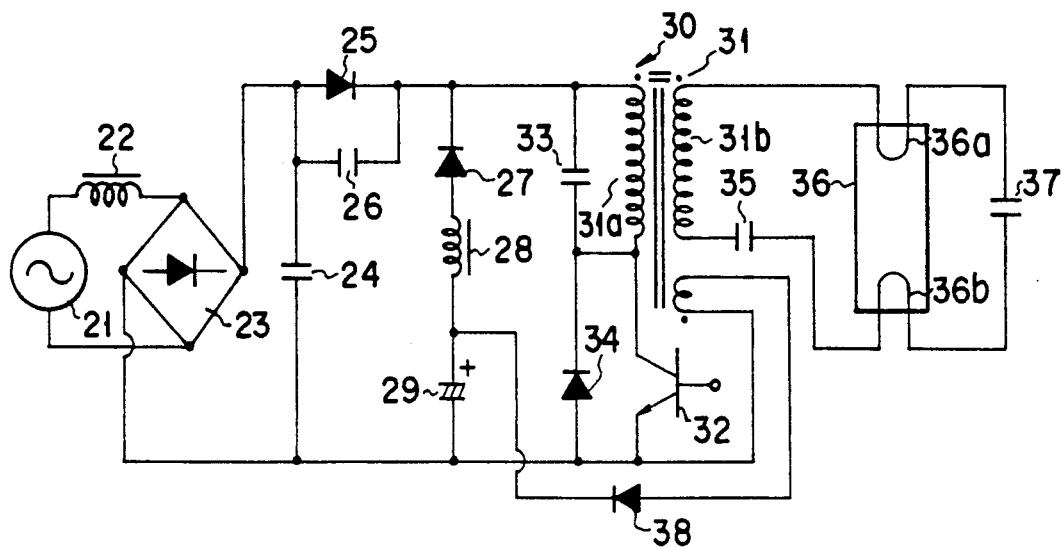

In the fifth modification shown in FIG. 11, the second capacitor 26 shown in FIG. 2 is connected in parallel with the diode 25. The second capacitor 26 and inductor 28 constitute a resonance circuit, and operate in the same manner as in the first embodiment. Therefore, the same effects as those in the first embodiment can be obtained.

Figure 12:
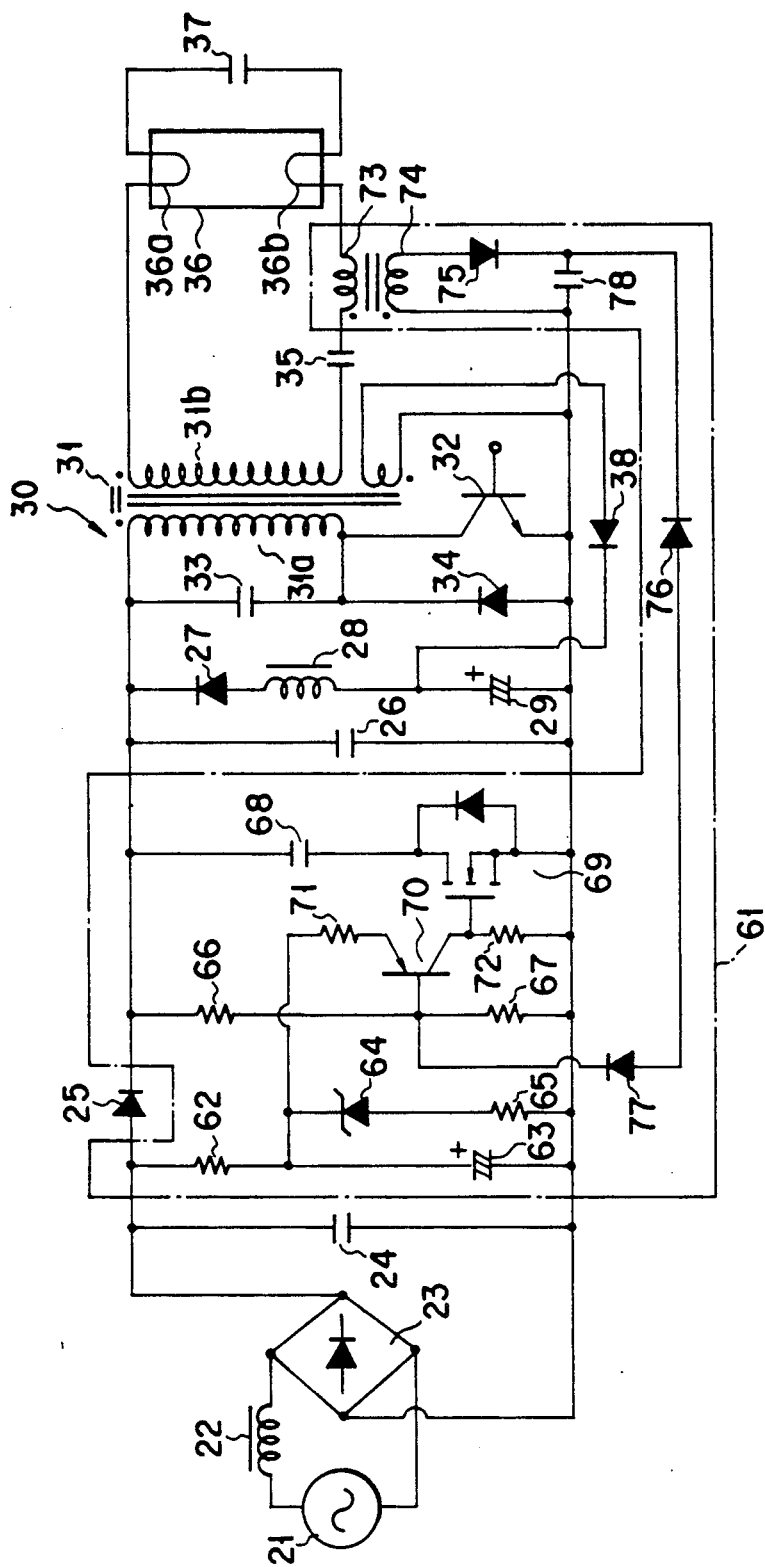

In the sixth modification shown in FIG. 12, a variable capacitance control circuit 61 is further provided. This control circuit 61 includes resistors 62, 65, 66, 67, 71, and 72, capacitors 63, 68, and 78, Zener diodes 64 and 76, a MOS field effect transistor (FET) 69, a PNP transistor 70, an inductor 73, a coil 74, and diodes 75 and 77. A series circuit of the resistor 62 and the capacitor 63 is connected in parallel with the first capacitor 24. A series circuit of the Zener diode 64 and the resistor 65 is connected in parallel with the capacitor 63. A series circuit of the resistor 66 and the resistor 67 is connected in parallel with the first capacitor 24 through the diode 25. A series circuit of the third capacitor 68 and the MOSFET 69 is connected in parallel with the second capacitor 26. The emitter of the PNP transistor 70 is connected to the cathode of the Zener diode 64 through the resistor 71. The collector of the PNP transistor 70 is connected to the gate of the MOSFET 69 and is further connected to the negative terminal of the capacitor 63 through the resistor 72. The base of the PNP transistor 70 is connected to the node of the resistors 66 and 67. On the load side, the inductor 73 is connected between the capacitor 35 and the filament 36b of the discharge lamp 36, and the coil 74 is magnetically coupled to the inductor 73. One end of the coil 74 is connected to the negative terminal of the second capacitor 26, while the other end is connected to the base of the transistor 70 through a series circuit of the diode 75, the Zener diode 76, and the diode 77. In addition, the coil 74 is connected in parallel with the capacitor 78 through the diode 75.

In this arrangement, the inverter 30 can perform a stable oscillating operation regardless of variations in the voltage Vc1. In addition, harmonic components can be reduced. That is, the internal impedance of the transistor 70 changes in accordance with the voltage Vc1, and the MOSFET 69 receives a gate voltage corresponding to the impedance. As a result, the MOSFET 69 adjusts the composite capacitance of the second and third capacitors 26 and 68 so that the voltage Vc2 across the second capacitor 26 can be maintained almost constant, regardless of the variation in the voltage Vc1. The same effects as those in the first embodiment can also be obtained.

Figure 13:
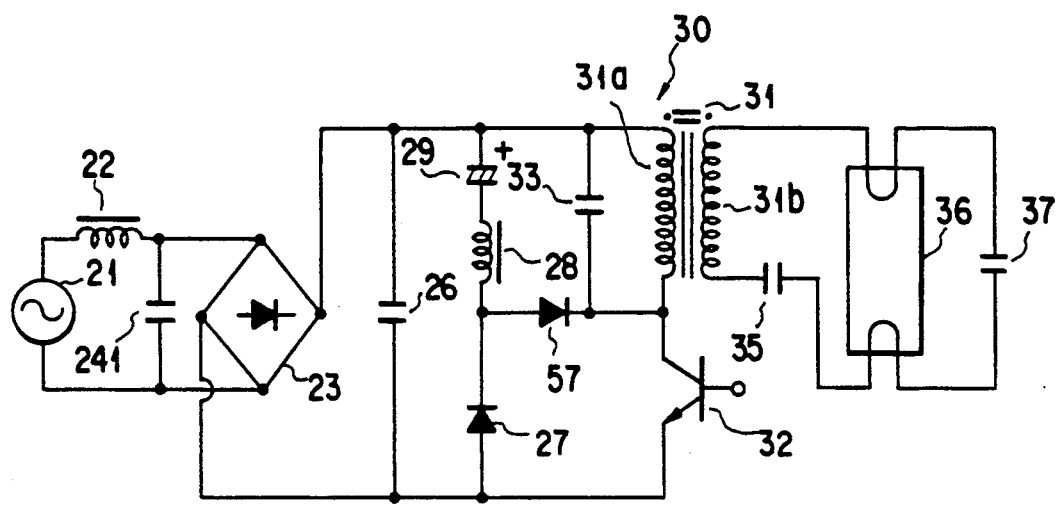

In the seventh modification shown in FIG. 13, the first capacitor 24 shown in FIG. 2 is replaced by a first capacitor 241 connected to the AC power source 21 through the inductor 22. The input portion of the full-wave rectifier 23 is connected to the capacitor 241, and the output portion thereof is connected to the second capacitor 26 directly. The diodes of the full-wave rectifier 23 can serve as the diode 25 shown in FIG. 2. Therefore, the diode 25 can be eliminated in this modification. Further, the second capacitor 26 is connected in parallel with a series circuit of the charging capacitor 29, the inductor 28, and the diode 27. The node of the inductor 28 and the cathode of the diode 27 is connected to the collector of the transistor 32 through a diode 57. When the transistor 32 is turned on, the capacitors 24 and 26 are discharged to supply a current to each of the inductor 31a and a series circuit of the capacitor 29, the inductor 28, and the diode 57. At this time, the capacitor 29 stores a voltage Vc6 lower than a peak value Vpeak of the pulsating voltage from the rectifier 23. Therefore, the same effects as those in the first embodiment can also be obtained.

In the eighth modification shown in FIG. 14, the first capacitor 24 shown in FIG. 2 is replaced by a first capacitor 241 connected to the AC power source 21 through the inductor 22. The input portion of the full-wave rectifier 23 is connected to the first capacitor 241, and the output portion thereof is connected to the second capacitor 26. The diodes of the full-wave rectifier 23 can serve as the diode 25 shown in FIG. 2. Therefore, the diode 25 can be eliminated in this modification. In addition, the same effects as those in the first embodiment can be obtained.

In the first embodiment, the power supply apparatus is used to light a discharge lamp. However, the present invention can be applied to loads other than a discharge lamp.

Figure 16:
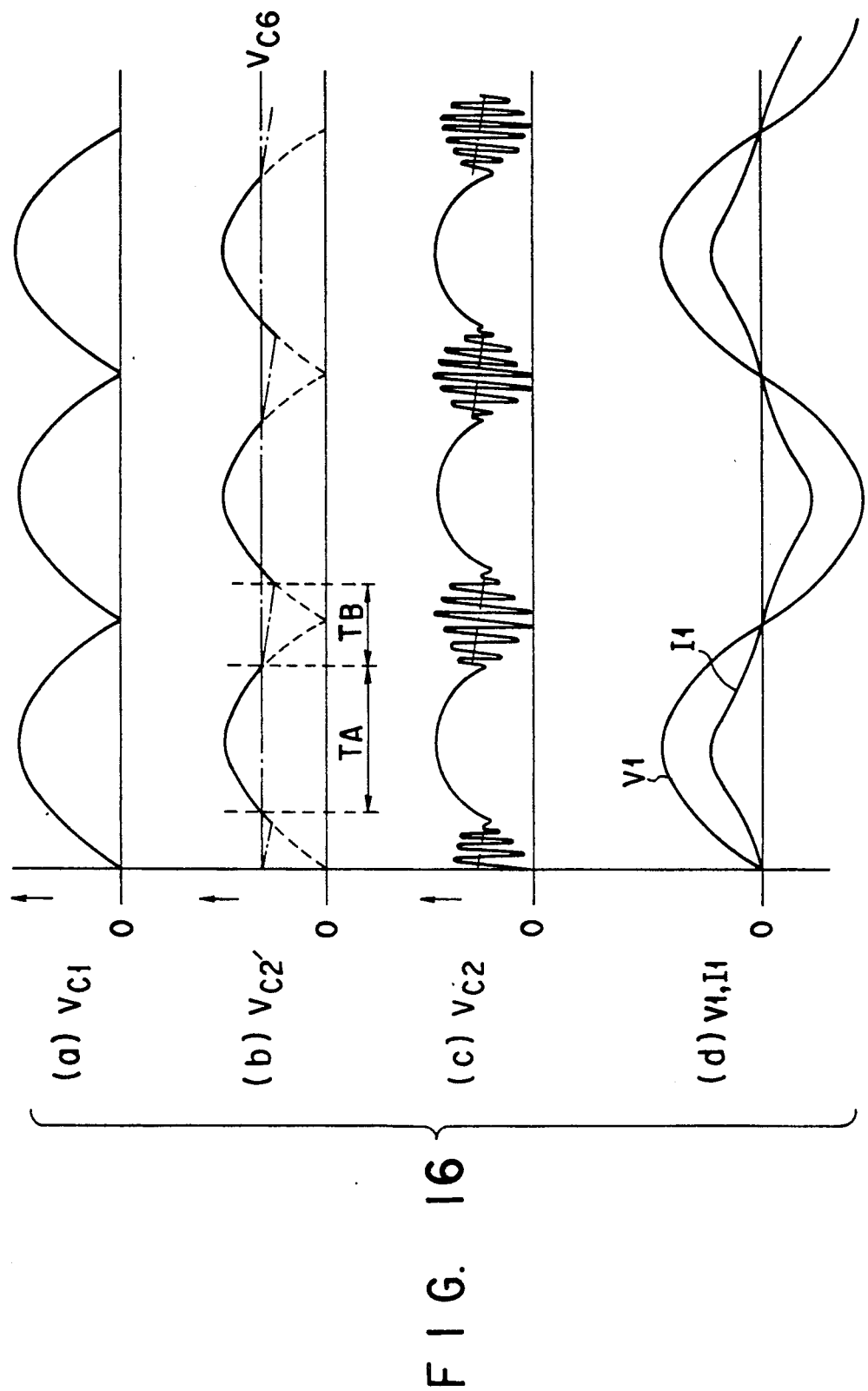
FIGS. 16(a) to 16(d) are timing charts showing the waveforms of voltages Vc1, Vc2′, Vc2, and V1 and a current I1 obtained in the power supply apparatus shown in FIG. 15.

A power supply apparatus according to a second embodiment of the present invention will be described below with reference to FIGS. 15 to 16(d).

FIG. 15 shows the circuit arrangement of this power supply apparatus. The same reference numerals in FIG. 15 denote the same parts as in the first embodiment. Likewise the first embodiment, the power supply apparatus includes inductors 22 and 28, a full-wave rectifier 23, capacitors 24, 26, 29, 33, and 35, diodes 25, 27, 34, and 38, a transformer 31, a switching transistor 32. The input portion of the full-wave rectifier 23 connected to an AC power source 21 through the inductor 22 serving as a filter. The output portion of the full-wave rectifier 23 is connected to the first capacitor 24 and is also connected to the second capacitor 26 through the diode 25 which is forward-biased on the positive pole side of the full-wave rectifier 23. The capacitance of the second capacitor 26 is set to be smaller than that of the first capacitor 24. The power supply apparatus further includes a switching transistor Q11 whose collector-to-emitter path is connected in parallel with the diode 25 in the reverse direction. The second capacitor 26 is connected in parallel with a series circuit of the diode 27, the inductor 28, and the charging capacitor 29. A discharge lamp ignitor section IG is connected, as a load circuit, to the second capacitor 26. The ignitor section IG includes a high-frequency inverter 30 constituted by the transformer 31, the capacitor 33, the diode 34, and the switching transistor 32. A series circuit of the switching transistor 32 and a primary winding 31a of the transformer 31 is connected between the two terminals of the second capacitor 26. The capacitor 33 is connected in parallel with the primary winding 31a, and the feedback diode 34 is connected in parallel with the collector-to-emitter path of the transistor 32. A secondary winding 31b of the transformer 31 is connected to a discharge lamp 36 through a capacitor 35. A starting capacitor 37 is connected between filaments 36a and 36b of the discharge lamp 36. This power supply apparatus includes a control section CNT constituted by diodes 38 and D15, a current transformer CT, a capacitor C17, and a resistor R15. A tertiary winding 31c of the transformer 31 is connected in parallel with the charging capacitor 29 through a primary winding CTa of the current transformer CT and the diode 38. The base of the transistor Q11 is connected to one end of the secondary winding CTb of the current transformer CT through the resistor R15 and the diode D15 and the emitter thereof is connected to the other end of the secondary winding CTb of the current transformer CT. The capacitor C17 is connected between the other end of the secondary winding CTb and the node of diode D15 and the resistor R15.

An operation of the power supply apparatus will be described next with reference to FIGS. 16(a) to 16(d).

When the power is turned on, the full-wave rectifier 23 rectifies an input voltage V1 from the commercial AC power source 21 to produce a DC pulsating voltage to be applied to the first and second capacitors 24 and 26. The voltage Vc2 across the second capacitor 26 is applied to the inverter 30. The switching operation of the transistor 32 causes the primary winding 31a and the capacitor 33 to resonate in the presence of the voltage Vc2. The resonant voltage obtained by the resonance is transmitted to the secondary winding 31b. When an output voltage from the secondary winding 31b is applied to the discharge lamp 36, a current flows in the discharge lamp 36 through the capacitor 37 to pre-heat the filaments 36a and 36b of the discharge lamp 36. In addition, a high voltage generated across the starting capacitor 37 is applied to the filaments 36a and 36b to start lighting the discharge lamp 36.

An operation after the discharge lamp 36 is lit will be described below, provided that a period in which the pulsating voltage Vc1 is higher than the charged voltage Vc6 across the charging capacitor 29 is represented by TA; and a period in which the pulsating voltage Vc1 is lower than the charged voltage Vc6, TB.

In the period TB, when the transistor 32 of the inverter 30 is turned on, a current flows in a loop constituted by the transistor 32, the diode 34, the capacitor 33, and the primary winding 31a in the presence of power supplied from the second capacitor 26 to the inverter 30. At this time, the primary winding 31a and the capacitor 33 resonate to generate a resonant voltage. The diode 25 blocks a reverse current, so that the resonance between the primary winding 31a and the capacitor 33 can be continued.

The capacitance of the second capacitor 26 is not large enough to operate the inverter 30 stably. For this reason, the voltage Vc2 across the second capacitor 26 gradually decreases. When the voltage Vc2 becomes lower than that of the first capacitor 24, power is supplied also from the fist capacitor 24 to the inverter 30. When the transistor 32 is turned off, the charging capacitor 29 is discharged to cause the inductor 28 and the capacitor 33 to resonate. The second capacitor 26 is charged by the resulting resonant voltage. While the charging capacitor 29 is in a discharged state, the control section CNT supplies no base current to the transistor Q11 to keep it in an OFF state.

In the period TA, when the transistor 32 of the inverter 30 is turned on, a current flows in the loop constituted by the transistor 32, the diode 34, the capacitor 33, and the primary winding 31a in the presence of power supplied from the first and second capacitors 24 and 26 to the inverter 30. At this time, the primary winding 31a and the capacitor 33 resonate to generate a resonant voltage. The resonant voltage is superposed on the voltage Vc2 across the second capacitor 26. The control section CNT supplies a base current corresponding to the voltage Vc6 to the transistor Q11 when the voltage Vc1 becomes higher than the voltage Vc6, so as to turn on the transistor Q11. That is, the charging capacitor 29 is charged by a charging current supplied through the primary winding CTa while the transistor Q11 is OFF in the period TA. The primary winding CTa causes a current to flow in the secondary winding CTb in accordance with the charging current. The current obtained from the secondary winding CTb is rectified by the diode D15, the capacitor C17, and the resistor R15, and supplied, as a base current, to the transistor Q11.

When the transistor Q11 is turned on, the reverse current blocked by the diode 25 is enabled to flow. At this time, the resonance conditions of the primary winding 31a and the capacitor 33 are greatly changed, resulting in a deviation from the oscillation frequency of the inverter 30. Consequently, as shown in FIG. 16(c), the resonant voltage is not superposed on the voltage Vc2. Note that the resonant voltage comes nearer to 0 as the capacitance of the first capacitor 24 becomes larger than that of the second capacitor 26.

In addition, since a current I1 supplied to the power supply apparatus is continuous, similar to a voltage V1, as shown in FIG. 16(d), harmonic components can be effectively reduced.

Furthermore, ripple in the current flowing in the transistor Q11 can be sufficiently absorbed by the first capacitor 24 having a relatively large capacitance, and harmonic components can be absorbed by the combination of the first capacitor 24, the second capacitor 26, and the diode 25.

In the second embodiment, the switching transistor Q11 is used as a switching element connected to the diode 25. However, a field effect transistor or a thyristor may be used in place of the transistor Q11.

A power supply apparatus according to the third embodiment of the present invention will be described below with reference to FIGS. 17 to 19(b).

This power supply apparatus is designed in consideration of the following problem in the first and second embodiments.

For example, in the power supply apparatus shown in FIG. 2, change in the actual voltage Vc2 across the capacitor 26, shown in FIG. 3(c), is large as compared with that of the ideal voltage Vc2'. Particularly, in the period TB during which a steep spike current is generated, the voltage oscillation becomes larger than that in the period TA. That is, the primary winding 31a of the transformer 31 stores electromagnetic energy while the transistor 32 is ON, and resonates with the capacitor 33 while the transistor 32 is OFF. At this time, a voltage is induced in the secondary winding 31b, and the discharge lamp 36 is lighted by this voltage. However, when the polarity of the resonant voltage is inverted at the resonance frequency specified by the primary winding 31a and capacitor 33, the voltage across the capacitor 26 is increased in accordance with a current flowing therein through the inductor 28 and the diode 27 to become higher than that of the capacitor 29. Subsequently, when the transistor 32 is turned on, the capacitor 29 is quickly charged by the capacitor 26 owing to unbalanced electrostatic energy corresponding to the potential difference between the capacitors 26 and 29. That is, a spike current flows, as a charging current, from the capacitor 26 to the capacitor 29. This spike current causes a switching loss with respect to the tranistor 32 and an increase in noise.

Figure 17:
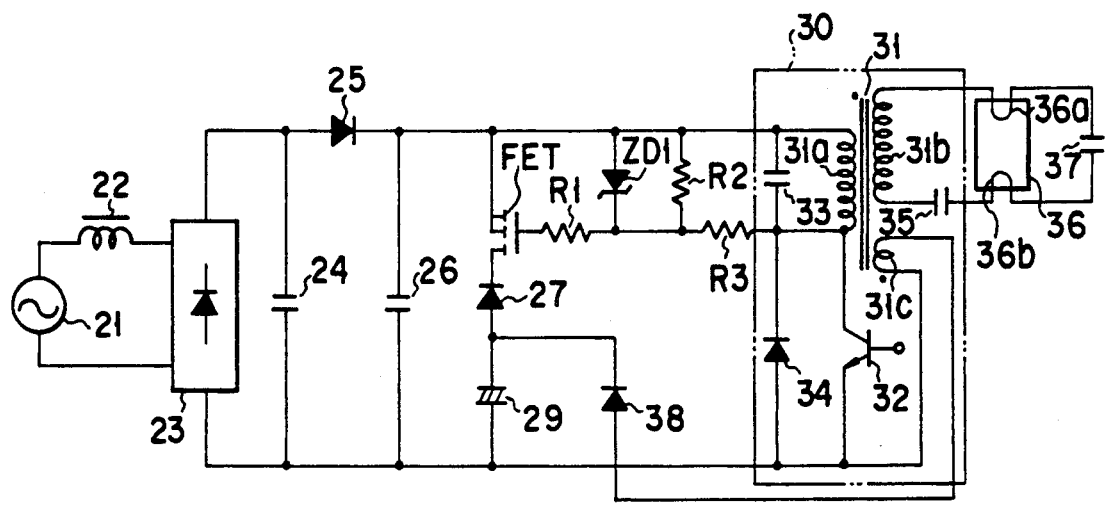
FIG. 17 is a circuit diagram showing the arrangement of a power supply apparatus according to a third embodiment of the present invention.

FIG. 17 shows the circuit arrangement of a power supply apparatus according to the third embodiment of the present invention. The same reference numerals in FIG. 17 denote the same parts as in the first embodiment. In this power supply apparatus, a commercial AC power source 21 is connected to the input portion of a full-wave rectifier 23 through an inductor 22 serving as a filter. The output portion of the full-wave rectifier 23 is connected to a first capacitor 24 and is also connected to a second capacitor 26 through a diode 25 forward-biased on the positive pole side of the full-wave rectifier 23. The capacitance of the second capacitor 26 is set to be smaller than that of the first capacitor 24. The second capacitor 26 is connected in parallel with a series circuit of a field effect transistor FET, a diode 27, and a charging capacitor 29. The transistor FET is a control switching element. The charging capacitor 29 is charged by a voltage lower than a peak value of the pulsating voltage Vc1 from the full-wave rectifier 23. The second capacitor 26 is connected to a high-frequency inverter 30. This inverter 30 includes a transformer 31, a switching transistor 32, a capacitor 33, a feedback diode 34. A series circuit of a primary winding 31a of the transformer 31 and the switching transistor 32 is connected between the two terminals of the capacitor 26. The capacitor 33 is connected in parallel with the primary winding 31a, and the diode 34 is connected in parallel with the collector-to-emitter path of the transistor 32. A secondary winding 31b of the transformer 31 is connected to a discharge lamp 36 through a capacitor 35. A starting capacitor 37 is connected between filaments 36a and 36b of the discharge lamp 36. The transformer 31 has a tertiary winding 31c, which is connected between the two terminals of the charging capacitor 29 through a diode 38. The gate of the field effect transistor FET is connected to a gate control circuit constituted by resistors R1, R2, and R3 and a Zener diode ZD1.

An operation of the power supply apparatus according to the third embodiment will be described next.

When the power is turned on, the full-wave rectifier 23 rectifies an input voltage V1 from the commercial AC power source 21 to produce a pulsating voltage to be applied to the first and second capacitors 24 and 26. The inverter 30 receives the voltage Vc2 across the second capacitor 26. The switching operation of the transistor 32 is performed in the presence of the received voltage, causing the primary winding 31a and the capacitor 33 to resonate. The resonant voltage obtained from this resonance circuit is transmitted to the secondary winding 31b. When an output voltage from the secondary winding 31b is applied to the discharge lamp 36, a current flows in the discharge lamp 36 through the capacitor 37 to pre-heat the filaments 36a and 36b of the discharge lamp 36. In addition, a high voltage generated across the starting capacitor 37 is applied to the filaments 36a and 36b to start lighting the discharge lamp 36.

While the transistor 32 is ON, since the voltage across the capacitor 33 is not increased, the Zener diode ZD1 is kept in an OFF state, and the transistor FET is OFF, thus supplying no current to the charging capacitor 29.

The voltage across the capacitor 33 is raised when the transistor 32 is turned off. When this voltage exceeds a voltage set by the resistors R2 and R3, the Zener diode ZD1 turns on the transistor FET to charge the capacitor 29 by a current flowing through a path constituted by the second capacitor 26, the transistor FET, and the diode 27.

Figure 18:
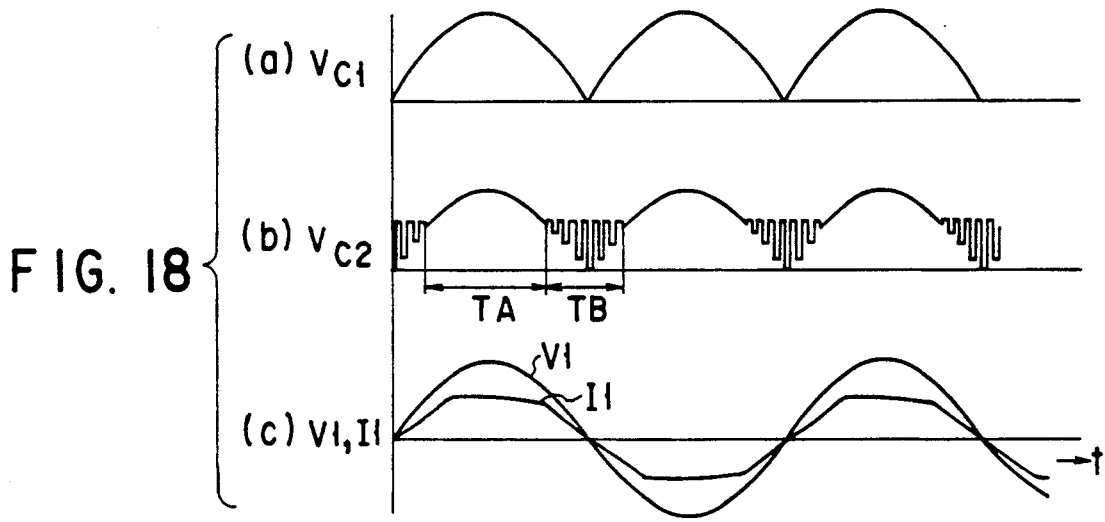
FIGS. 18(a) to 18(c) are timing charts showing the waveforms of voltages Vc1, Vc2, and V1 and a current I1 obtained in the power supply apparatus shown in FIG. 17.

In this embodiment, the inductor 28 shown in FIG. 2 is not required. As shown in FIG. 18(b), the voltage Vc2 does not oscillate in a period TA during which the transistor 32 is ON. In a period TB during which the transistor 32 is OFF, the peak of the voltage Vc2 is suppressed to a predetermined value or less because the resonant voltage does not exceed the charged voltage Vc6 across the charging capacitor 29. Therefore, a spike current which rises when the transistor 32 is turned on can be prevented, and a reduction in switching loss and noise can be achieved. In addition, as shown in FIGS. 18(a) to 19(b), harmonic components can be prevented.

A power supply apparatus according to the fourth embodiment of the present invention will be described with reference to FIGS. 20 to 23.

Figure 20:
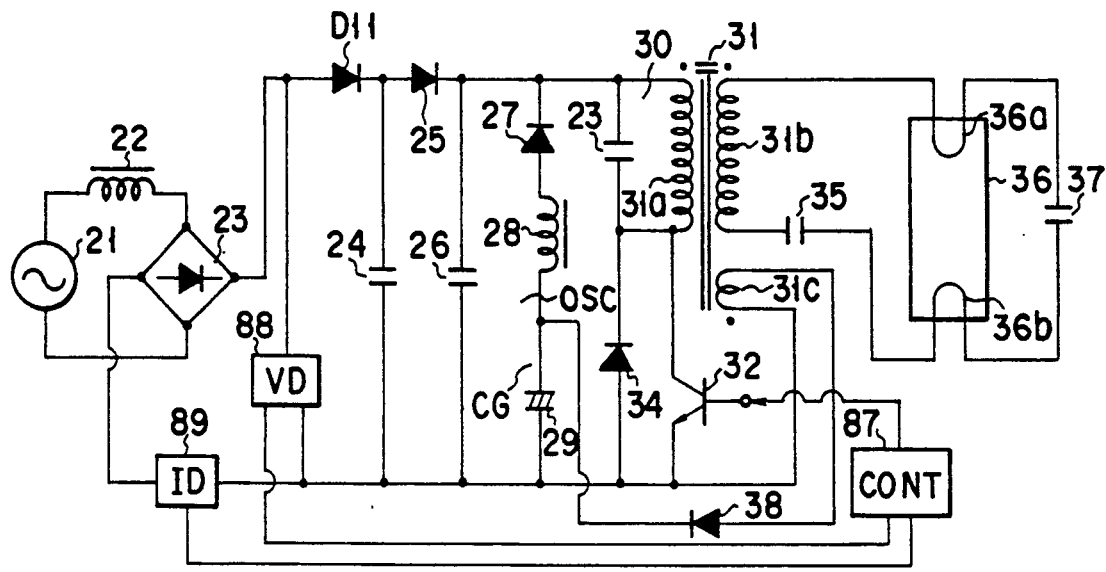
FIG. 20 is a circuit diagram showing the arrangement of a power supply apparatus according to a fourth embodiment of the present invention.
Figure 21:
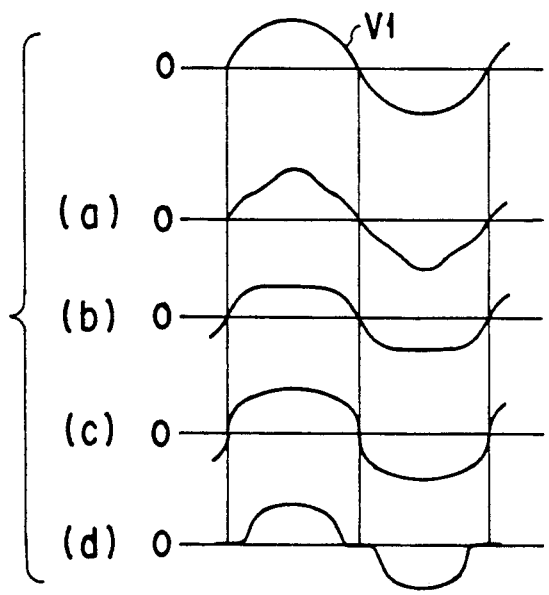
FIGS. 21(a) to 21(d) are timing charts each showing an example of the waveform of an input current I1 distorted with respect to the waveform of an input voltage V1.
Figure 22:
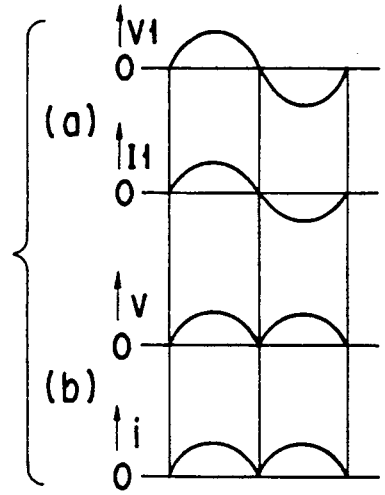
FIGS. 22(a) and 22(b) are timing charts showing the waveforms of an input voltage and input current to the power supply apparatus shown in FIG. 20 and the waveforms of an input voltage and input current to a voltage detector and a current detector.

FIG. 20 shows the circuit arrangement of this power supply apparatus. The same reference numerals in FIG. 20 denote the same parts as in the first embodiment. In the power supply apparatus, a commercial AC power source 21 is connected through an inductor 22 to the input portion of a full-wave rectifier 23 constituted by a diode bride, and the output terminal of the full-wave rectifier 23 is connected to a first capacitor 24 through a diode D11 serving as a rectification element. The first capacitor 24 is connected in parallel with a second capacitor 26 through a forward-biased diode 25 serving as a rectification element. The second capacitor 26 is connected in parallel with a charging circuit CG constituted by a series circuit of a reverse-biased diode 27, an inductor 28, and a charging capacitor 29, and is further connected to a high-frequency inverter 30 of a single transistor type. This high-frequency inverter 30 serves as a load and includes a series circuit of a primary winding 31a of a transformer 31 and a switching transistor 32, a resonance capacitor 33, and a feedback diode 34. The resonance capacitor is connected in parallel with the primary winding 31a. The diode 34 is connected in parallel to the collector-to-emitter path of the transistor 32. The series circuit of the primary winding 31a and switching transistor 32 is connected in parallel with the second capacitor 26. The base of the switching transistor 32 is connected to a control circuit 87 which controls a high-frequency switching operation of the transistor 32. This control circuit 87 is connected to a voltage detector 88 and a current detector 89. The voltage detector 88 is connected between the output terminals of the full-wave rectifier 23, and the current detector 89 is interposed in a line connected to one output terminal of the full-wave rectifier 23. A secondary winding 31b of the transformer 31 is connected to a discharge lamp 36 through a capacitor 35. A starting capacitor 37 is connected between filaments 36a and 36b of the discharge lamp 36. The transformer 31 has a tertiary winding 31c, which is connected in parallel with the charging capacitor 29 through a diode 38. An oscillator OSC is constituted by the second capacitor 26, the diode 27, the inductor 28, the charging capacitor 29, the tertiary winding 31c of the transformer 31, and the diode 38.

An operation of the power supply apparatus of the fourth embodiment is basically the same as that of the first embodiment described with reference to FIGS. 3(a) to 3(d), and hence a description thereof will be omitted.

Frequency control by the control circuit 87 will be described next.

When a current I1 is supplied in phase with a voltage V1 from the commercial AC power source 21, as shown in FIG. 22(a), a voltage and a current are input to the voltage detector 88 and the current detector 89, as shown in shown in FIG. 22(b).

The components of the high-frequency inverter 30, i.e., the capacitor 33, the second capacitor 26, the transistor 32, the transformer 31, and the inductor 28 generally have allowable errors set within a range from q 5 to 10%. If energy supplied to the high-frequency inverter 30 cannot satisfy the energy consumption of the inverter 30 due to these errors, the waveform of the sinusoidal input current I1 is distorted, as shown in FIGS. 21(a) to 21(d).

In a case wherein the load is inductive as shown in FIG. 20, the distorted waveform of this input current I1 is shaped into a waveform similar to a sine wave by using a phenomenon that the load impedance changes with a change in frequency. When, for example, the current I1 is increased with respect to the sinusoidal voltage V1 due to a decrease in load, as shown in FIGS. 21(a) and 21(c), the control circuit 87 increases the switching frequency of the transistor 32 to increase the energy consumption of the inverter 30. In contrast to this, when the current I1 is decreased with respect to the sinusoidal voltage V1 due to an increase in load, as shown in FIGS. 21(b) and 21(d), the control circuit 87 decreases the switching frequency of the transistor 32 to reduce the energy consumption of the inverter 30.

Similarly, in a case wherein the load is capacitive, the distorted waveform of the input current I1 is shaped into a waveform similar to a sine wave by using the above-described phenomenon. When, for example, the current I1 is decreased with respect to the sinusoidal voltage V1 due to an increase in load, as shown in FIGS. 21(b) and 21(d), the control circuit 87 decreases the switching frequency of the transistor 32 to reduce the energy consumption of the inverter 30. In contrast to this, when the current I1 is increased with respect to the sinusoidal voltage V1 due to a decrease in load, as shown in FIGS. 21(a) and 21(c), the control circuit 87 increases the switching frequency of the transistor 32 to increase the energy consumption of the inverter 30.

In the above-described embodiment, harmonic components of an input current I1 can be suppressed, and a reduction in size and cost can be realized together with simplification of the arrangement.

Figure 19:
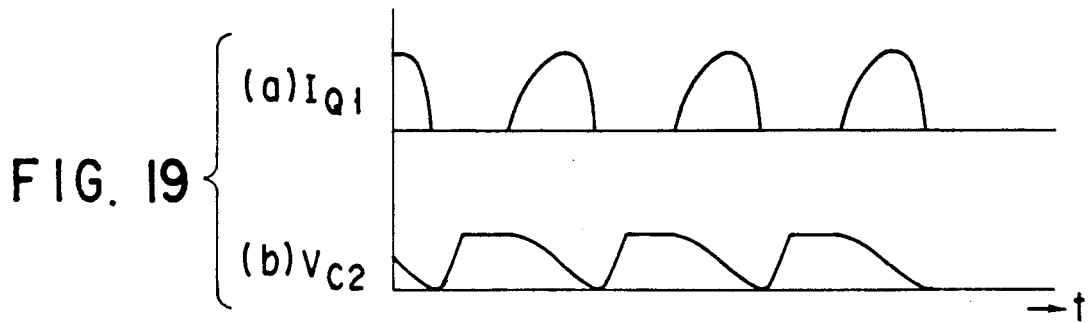
FIGS. 19(a) and 19(b) are timing charts showing the waveforms of a current IQ1 and a voltage Vc2 obtained in the power supply apparatus in FIG. 17 in detail.
Figure 23:
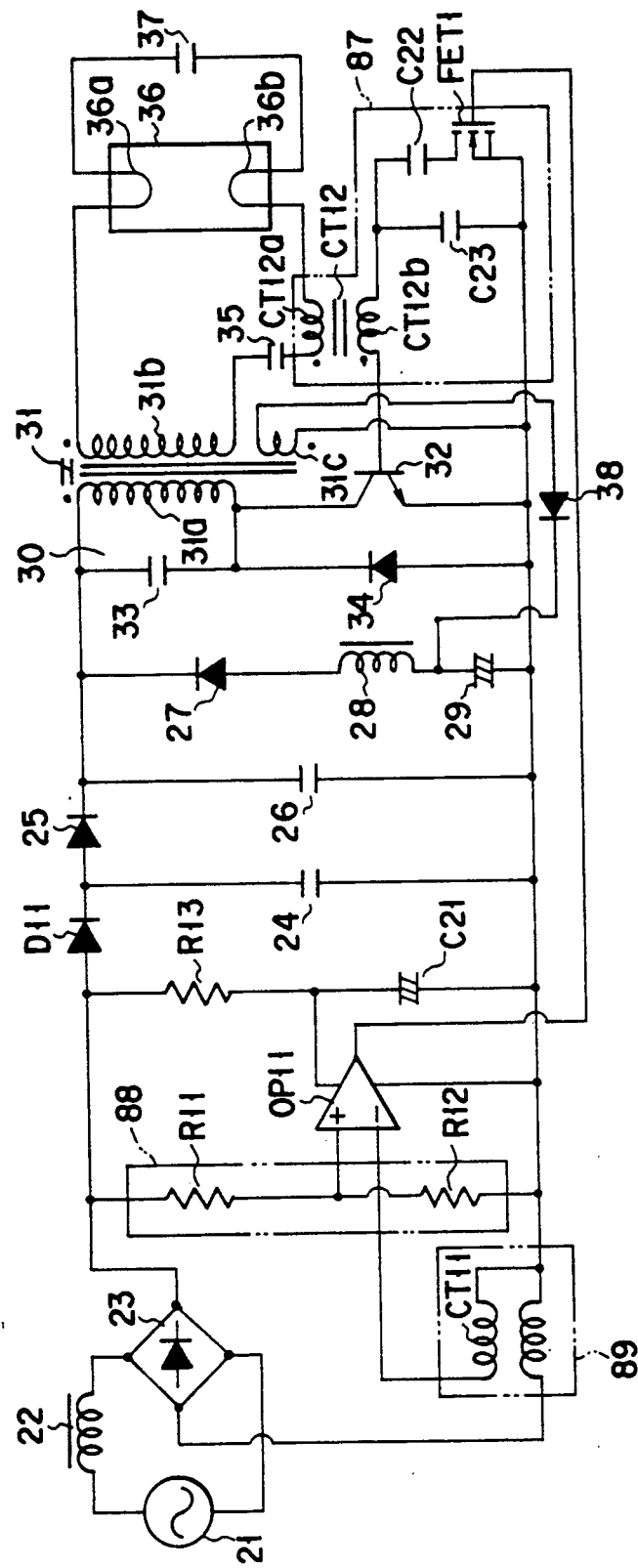
FIG. 23 is a circuit diagram showing the arrangement of the power supply apparatus shown in FIG. 20 in more detail.

FIG. 23 shows the circuit arrangement of the power supply apparatus in FIG. 19 in more detail.

As shown in FIG. 23, the voltage detector 88 has a series circuit of two resistors R11 and R12, and the current detector 89 has a current transformer CT11. Outputs from the voltage detector 88 and the current detector 89 are compared with each other in an operational amplifier OP11. An output from the operational amplifier OP11 is supplied to the control circuit 87. The operational amplifier OP11 operates in the presence of a voltage applied from a series circuit of a resistor R13 and a capacitor C21, which is connected to the full-wave rectifier 23. The control circuit 87 has a current transformer CT12. In this current transformer CT12, a detection winding CT12a is connected between the capacitor 35 and the filament 36b of the discharge lamp 36, and an output winding CT12b is connected series with a capacitor C22 and a transistor FET1 between the base and emitter of the transistor 32. A series circuit of the capacitor C22 and the transistor FET1 serves as a variable capacitance section and is connected in parallel with the capacitor C23.

When an output voltage from the voltage detector 88 becomes higher than an output voltage from the current detector 89, an output voltage of H level is applied from the operational amplifier OP11 to the gate of the transistor FET1. At this time, the transistor FET1 increases the capacitance across the variable capacitance section to decrease the frequency of the high-frequency inverter 30. With this decrease in frequency, the impedance of the high-frequency inverter 30 is decreased to bring the waveform of the input current close to a sine wave.

In contrast to this, when an output voltage from the detector 88 becomes lower than an output voltage from the detector 89, an output voltage of L level is applied from the operational amplifier OP11 to the gate of the transistor FET1. At this time, the transistor FET1 decreases the capacitance across the variable capacitance section to increase the frequency of the high-frequency inverter 30. With this increase in frequency, the impedance of the high-frequency inverter 30 is increased to bring the waveform of the input current close to a sine wave. Note that such a result can be obtained without the capacitor C23.

In addition, the high-frequency inverter 30 is not only separately-excited, but also self-excited. In the self-excited high-frequency inverter 30, the oscillation frequency is controlled by changing the capacitance coupled to the base.

FIG. 24 shows a modification of the fourth embodiment. In this modification, a field effect transistor FET2 is connected in series with the capacitor C23. The gates of the transistors FET1 and FET2 are connected to the emitter of a bypass transistor Q21 and the collector of a bypass transistor Q22, respectively. The inductor 28 is magnetically coupled to a detection winding L22. One end of the winding L22 is connected to the bases of the transistors Q21 and Q22, and the other end thereof is connected to the collector of the transistor Q21 and the emitter of the transistor Q22. A capacitor C24 is connected between the other end of the winding L22 and the node of the diode D21 and resistor R14.

In the power supply apparatus shown in FIG. 24, the control circuit 87 controls the switching frequency of a transistor 32 in only a period TB during which the charging capacitor 29 is discharged. That is, when the charging capacitor 29 is charged, an L-level current is supplied to the base of the transistor Q21. At this time, the transistor Q21 bypasses an output from the operational amplifier OP11 so as not to apply a voltage to the gate of the field effect transistor FET1. The gate voltage of the transistor FET2 can be controlled in accordance with variations in load or the like. If no control operations other than inhibiting control of the field effect transistor FET1 are performed, there is a possibility that the capacitance on a side of the capacitor C22 is reduced to 0, and the energy consumption is excessively reduced due to a increase in the frequency of the high-frequency inverter 30. Note that since the transistors Q21 and Q22 have opposite characteristics, only one of the field effect transistors FET1 and FET2 is controlled. That is, the field effect transistor FET1 is not controlled while the field effect transistor FET2 is controlled, and vice versa.

According to the power supply apparatus of this modification, when the voltage from the full-wave rectifier 23 is higher than the charged voltage across the charging capacitor 29, the oscillation frequency is not changed to prevent the change from being uncontrollable. On the other hand, when the voltage from the full-wave rectifier 23 is lower than the charged voltage across the charging capacitor 29, the oscillation frequency is changed to suppress the generation of harmonic components.

Although the fourth embodiment uses a high-frequency inverter of a single transistor type, another type of inverter may be used.

Components used for the above control may be integrated as a digital circuit to realize a compact multifunction product. For example, an output signal from the operational amplifier OP11 can be converted into a digital signal by means of an analog-to-digital converter. If the converter produces the digital signal as a count which determines the width of the switching pulses, the count is decreased to increase the switching frequency, and increased to decrease the switching frequency. The oscillating frequency of the inverter 30 is set in accordance with the thus determined switching frequency. However, digital control schemes other than this scheme may be used.

The power supply apparatus of each embodiment described above is used to light a discharge lamp.

However, the present invention can be applied to loads other than a discharge lamp.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A power supply apparatus comprising:
   full-wave rectification means for rectifying an AG voltage supplied from an AC power source is output a DC pulsating voltage from first and second output terminals thereof, the potential of the first output terminal being set higher than the potential of the second output terminal;
   a first capacitor coupled between said first and second output terminals of said rectification means, for storing a current from said rectification means;
   a diode having an anode coupled to said first output terminal of said rectification means, for supplying a current from said first capacitor;

a second capacitor coupled to receive the current supplied through said diode, for storing the current received from said diode;

high-frequency inverter means, coupled between a cathode of said diode and said second output terminal of said rectification means, for receiving an input current supplied from said first and second capacitors when said diode is forward-biased and for receiving an input current from said second capacitor when said diode is reverse-biased, and for performing an oscillating operation in which the received input current is switched at a high frequency, and thereby producing an output voltage to be supplied to a load; and oscillation means, including a series circuit of an inductor and a third capacitor in which said series circuit is coupled in parallel with said second capacitor, for charging said third capacitor to a predetermined level lower than a peak level of the DC pulsating voltage which is output from said rectification means, and for causing said inductor and said second capacitor to oscillatory resonate under the voltage across said third capacitor when said DC pulsating voltage falls below the voltage across the third capacitor; and wherein a condition for resonance between said inductor and said second capacitor is set such that an amplitude of a resonant voltage is increased as the DC pulsating voltage output from said rectification means becomes lower than the voltage across said third capacitor.

2. An apparatus according to claim 1, wherein said oscillation means comprises means for causing said inductor and said second capacitor to resonate in synchronism with the oscillating operation of said high-frequency inverter means so as to increase the voltage across said second capacitor as the DC pulsating voltage form said rectification means becomes lower than the voltage across said third capacitor.

3. An apparatus according to claim 1, further comprising capacitance control means for variably changing a capacitance of said second capacitor in accordance with a variation in the DC pulsating voltage from said rectification means.

4. An apparatus according to claim 1, wherein said second capacitor is connected in parallel with said diode.

5. An apparatus according to claim 1, wherein said second capacitor is connected in parallel with said first capacitor through said diode.

6. An apparatus according to claim 1, further comprising:

switching means connected in parallel with said diode in a reverse direction; and switching control means coupled to said third capacitor, for turning on said switching means only when said third capacitor is charged.

7. An apparatus according to claim 1, wherein:

said high-frequency inverter means includes a single oscillation switching element for performing a switching operation; and said oscillation means includes a switching control element connected in series with said third capacitor, for performing a switching operation in opposite phase to that of said single oscillation switching element.

8. An apparatus according to claim 1, further comprising frequency control means for changing an oscillation frequency of said high-frequency inverter means in accordance with the DC pulsating voltage from said rectification means.

9. An apparatus according to claim 8, wherein said frequency control means comprises means for changing a frequency of said high-frequency inverter means when the DC pulsating voltage from said rectification means falls below the voltage across said third capacitor.

10. An apparatus according to claim 2, further comprising capacitance control means for variably changing a capacitance of said second capacitor in accordance with a variation in the DC pulsating voltage from said rectification means.

11. A power supply apparatus comprising:

a first capacitor coupled in parallel with an AC power source, for storing a current from said AC power source;

full-wave rectification means coupled in parallel with said first capacitor, for rectifying an AC voltage from said first capacitor and to output a DC pulsating voltage from first and second output terminal thereof, the potential of said first output terminal being set higher than the potential of said second output terminal;

a second capacitor coupled between said first and second output terminals of said rectification means, for storing a current supplied through said rectification means;

high-frequency inverter means, coupled between said first and second output terminals of said rectification means, for receiving an input current supplied from said first and second capacitors when said rectification means is forward-biased and for receiving an input current supplied from said second capacitor when said rectification means is reverse-biased, and for performing an oscillating operation in which the received input current is switched at a high frequency, and thereby producing an output voltage to be supplied to a load; and oscillation means, including a series circuit of an inductor and a third capacitor in which said series circuit is coupled in parallel with said second capacitor, for charging said third capacitor to a predetermined level lower than a peak level of the DC pulsating voltage which is output from said rectification means, and for causing said inductor and said second capacitor to oscillatory resonate under the voltage across said third capacitor when said DC pulsating voltage falls below the voltage across said third capacitor; and wherein a condition for resonance between said inductor and said second capacitor is set such that an amplitude of a resonant voltage is increased as the DC pulsating voltage output from said rectification means becomes lower than the voltage across said third capacitor.

* * * * *